US007765018B2

(12) United States Patent
Hiroi et al.

(10) Patent No.: US 7,765,018 B2
(45) Date of Patent: Jul. 27, 2010

(54) CONTROL DEVICE FOR CONTROLLING AUDIO SIGNAL PROCESSING DEVICE

(75) Inventors: Makoto Hiroi, Hamamatsu (JP); Masatoshi Hanashiro, Hamamatsu (JP); Hiromu Miyamoto, Hamamatsu (JP); Toshiyuki Ito, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 775 days.

(21) Appl. No.: 11/170,627

(22) Filed: Jun. 28, 2005

(65) Prior Publication Data

US 2006/0005130 A1 Jan. 5, 2006

(30) Foreign Application Priority Data

Jul. 1, 2004 (JP) ............................ 2004-195937
Jul. 1, 2004 (JP) ............................ 2004-195943

(51) Int. Cl.
*G06F 17/00* (2006.01)

(52) U.S. Cl. ........................................ 700/94; 715/716

(58) Field of Classification Search .................... 700/94
See application file for complete search history.

(56) References Cited

U.S. PATENT DOCUMENTS 5,402,501 A * 3/1995 Silfvajt et al. ............... 381/119
5,862,231 A * 1/1999 Tokuhisa ..................... 381/61
5,964,865 A * 10/1999 McCulloch et al. ........... 712/35
6,035,297 A * 3/2000 Van Huben et al. ............ 707/8
6,061,599 A * 5/2000 Rhodehamel et al. .......... 700/2
6,202,197 B1 * 3/2001 Robinson et al. .............. 716/17
6,300,951 B1 * 10/2001 Filetto et al. ................ 715/797
6,359,632 B1 * 3/2002 Eastty et al. ................ 715/716
6,470,380 B1 * 10/2002 Yoshizawa et al. .......... 709/213
6,564,112 B1 * 5/2003 Factor ......................... 700/97
6,601,081 B1 * 7/2003 Provino et al. ................. 718/1
6,611,537 B1 * 8/2003 Edens et al. ................ 370/503
6,651,225 B1 * 11/2003 Lin et al. ....................... 716/4
6,658,578 B1 * 12/2003 Laurenti et al. ............. 713/324
6,664,460 B1 * 12/2003 Pennock et al. ............... 84/662
6,738,964 B1 * 5/2004 Zink et al. .................. 717/105
6,754,351 B1 * 6/2004 Tanji ........................... 381/61
6,754,763 B2 * 6/2004 Lin ............................ 710/317
6,760,635 B1 * 7/2004 Bates et al. ................... 700/94
6,760,888 B2 * 7/2004 Killian et al. .................. 716/1
6,789,090 B1 * 9/2004 Miyake et al. ........... 707/104.1

(Continued)

OTHER PUBLICATIONS

Yamaha Digital Mixing Engine DME 32, Owner's Manual, Yamaha Corporation, Japan, May 2000.

*Primary Examiner*—Curtis Kuntz
*Assistant Examiner*—Paul McCord
(74) *Attorney, Agent, or Firm*—Morrison & Foerster LLP

(57) ABSTRACT

In a PC that controls a mixer engine having a programmable DSP, any object such as a knob or the like is enabled to be duplicated from a control screen corresponding to various signal processing components and disposed at any position on a user control screen to make it possible to use the user control screen as a control screen editable by a user. When an object such as a knob is designated in the user control screen and a predetermined direction is issued, a menu is displayed on a display. Then, when "Open Original" is selected from the menu, it is understood that display of the control screen including an original of the designated object is directed, and the control screen is displayed on the display.

10 Claims, 12 Drawing Sheets

U.S. PATENT DOCUMENTS

| | | | | |
|---|---|---|---|---|
| 6,810,442 | B1 * | 10/2004 | Lin et al. | 710/22 |
| 7,065,637 | B1 * | 6/2006 | Nanja | 713/1 |
| 7,078,608 | B2 * | 7/2006 | Aiso et al. | 84/625 |
| 7,111,242 | B1 * | 9/2006 | Grooters | 715/744 |
| 7,119,267 | B2 * | 10/2006 | Hirade et al. | 84/602 |
| 7,139,624 | B2 * | 11/2006 | Terada et al. | 700/94 |
| 7,167,764 | B2 * | 1/2007 | Nakayama et al. | 700/94 |
| 7,200,813 | B2 * | 4/2007 | Funaki | 715/716 |
| 7,206,391 | B2 * | 4/2007 | Chiu et al. | 379/88.25 |
| 7,472,165 | B2 * | 12/2008 | Sawada | 709/207 |
| 2002/0072816 | A1 * | 6/2002 | Shdema et al. | 700/94 |
| 2002/0112097 | A1 * | 8/2002 | Milovanovic et al. | 709/331 |
| 2002/0147554 | A1 * | 10/2002 | Pickerd | 702/66 |
| 2002/0156547 | A1 * | 10/2002 | Suyama et al. | 700/94 |
| 2002/0174215 | A1 * | 11/2002 | Schaefer | 709/224 |
| 2003/0069947 | A1 * | 4/2003 | Lipinski | 709/220 |
| 2003/0156688 | A1 * | 8/2003 | McCarty et al. | 379/67.1 |
| 2003/0184580 | A1 * | 10/2003 | Kodosky et al. | 345/734 |
| 2003/0192008 | A1 * | 10/2003 | Lee | 715/506 |
| 2004/0030425 | A1 * | 2/2004 | Yeakel et al. | 700/94 |
| 2004/0185877 | A1 * | 9/2004 | Asthana et al. | 455/456.6 |
| 2004/0233237 | A1 * | 11/2004 | Randow | 345/763 |
| 2004/0233316 | A1 * | 11/2004 | Battles et al. | 348/333.02 |
| 2004/0240446 | A1 * | 12/2004 | Compton | 370/389 |
| 2004/0255329 | A1 * | 12/2004 | Compton et al. | 725/109 |
| 2005/0041015 | A1 * | 2/2005 | Kohda et al. | 345/156 |
| 2005/0055646 | A1 * | 3/2005 | Melzer | 715/804 |
| 2005/0066336 | A1 * | 3/2005 | Kavoori et al. | 719/321 |
| 2005/0071747 | A1 * | 3/2005 | Jaeger | 715/500.1 |
| 2006/0117274 | A1 * | 6/2006 | Tseng et al. | 716/1 |
| 2007/0186002 | A1 * | 8/2007 | Campbell et al. | 709/231 |

* cited by examiner

CONTROL DEVICE FOR CONTROLLING AUDIO SIGNAL PROCESSING DEVICE

BACKGROUND OF THE INVENTION

1. Field of the Invention

The invention relates to a control device that causes an audio signal processing device having an audio signal processor wherein a processing content can be programmed to execute signal processing based on a configuration of signal processing having a plurality of components and wires connecting the components, and a program causing a computer to function as such a control device.

2. Description of the Related Art

Conventionally, there has been a well-known audio signal processing device in which an audio signal processing module is composed using a processor operable following a program, and an external computer such as a PC (personal computer) or the like executes application software to function as a control device so that audio signals can be processed based on a configuration of signal processing edited using the control device. Such an audio signal processing device is called a mixer engine in the present application. The mixer engine stores therein the configuration of signal processing edited by the PC and can independently perform processing on audio signals based on the stored configuration of signal processing.

It is known that in the above described PC, the above described configuration of signal processing can be edited by arranging components being components for signal processing on an edit screen of a display, and setting wires between the arranged components.

It is also known that as the function of the application software, a control screen for setting a parameter for signal processing relating to a component is displayed by double-clicking on the component on the edit screen, so that the value of the parameter can be set by a control in the control screen.

Further, it is known that as an editable control panel (another control screen) capable of being disposed any control thereon duplicated from the control screens, a user control can be created. It is also known that by operating the control disposed on such a user control, the value of a parameter corresponding to the original control is controlled, so that the mixer engine can execute signal processing in accordance with the value.

The mixer engine and application software described above are described, for example, in Owner's Manual of a digital mixing engine "DME32 (trade name)" available from YAMAHA Co., especially pp. 21 to 64, 69, and 190 to 192.

SUMMARY OF THE INVENTION

When a user duplicates some of controls from a control screen of a certain component, edits the above described user control, and uses it, there arises the demand to store parameters in a range controlled with the user control and recall the stored parameters. The conventional mixer engine and control apparatus, however, has the problem of being unable to perform such an operation and low in convenience in this respect. Even if such an operation is made possible, there exists the problem that a trouble sometimes occurs when only the parameters corresponding to the controls disposed in the user control are simply to be stored and recalled.

Namely, some parameters specify a series of contents, for example, a characteristic of a filter and the like with a plurality of such parameters which are related to one another, but all the controls of them are not disposed in the user control. In such a case, there arises the problem that when only the parameter corresponding to a control disposed in the user control is recalled, a balance with the parameters of the other parts is sometimes lost.

In the user control, after a parameter is stored, the corresponding control is sometimes deleted. There exists the problem that when the stored parameters are recalled as they are in such a case, parameters which are not related to the control in the user control are also recalled.

An object of the invention is to solve the above-described problems and to increase convenience related to storing and recall of parameters when using an editable control screen in a control device that causes an audio signal processing device having an audio signal processor wherein a processing content can be programmed to execute signal processing based on a configuration of signal processing having a plurality of components and wires connecting the components.

Further, when a user duplicates some of controls from a control screen of a certain component and edits the above described user control and uses it, the user sometimes wants to control values of other parameters of the components corresponding to the controls. The user sometimes also wants to add the controls for controlling the values of above-described other parameters to a user control screen. In order to perform such a control and addition, it is necessary to display (recall) a control screen of the component corresponding to a control on a display.

For this purpose, however, a complicated operation of investigating what component corresponds to the control first, searching the component in an edit screen, a list or the like, and issuing a direction to open the control screen of the component is required, thus causing the problem of the operation being complicated.

In the conventional application software, there is the one in which by designating a control and performing a predetermined operation in a screen corresponding to the user control, information of a component corresponding to the control can be known in a property screen. However, several steps of operations are needed for this purpose, and in order to open the control screen thereafter, an operation of searching a component and opening the control screen as described above is required. Therefore, the operation is also complicated.

Another object of the invention is to solve the above problem and enhance operability on an occasion of using a control screen editable by a user, in a control device that causes an audio signal processing device having an audio signal processor wherein a processing content can be programmed to execute signal processing based on a configuration of signal processing including a plurality of components and wires connecting the components.

To achieve the above described objects, a control device of the invention is a control device that causes an audio signal processing device having a signal processor wherein processing content can be programmed to execute signal processing based on a configuration of signal processing having a plurality of components and wires connecting the components, including a first controller that prepares a first control screen for setting a value of a parameter that is used when causing the audio signal processing device to execute signal processing relating to a component, with respect to each component in the configuration of signal processing; a second controller that disposes a duplication of an object in the first control screen into a second control screen editable by a user; an accepting device that accepts a direction to display the first control screen including an original of the object, with respect to the object disposed in the second control screen; and a display controller that causes a display to display the first control screen including the original of the object in accordance with the direction which the accepting device accepts.

In the above-described control device, it is preferable that the above-described accepting device is provided with a third controller that displays a control portion for accepting a direction to display the first control screen including an original of a designated object in the vicinity of the designated object in the display, when the object is designated in the second control screen and a predetermined direction is issued.

Further, another control device of the invention is a control device that causes an audio signal processing device having a signal processor wherein a processing content can be programmed to execute signal processing based on a configuration of signal processing having a plurality of components and wires connecting the components, including a first controller that prepares a first control screen for setting a value of a parameter that is used when causing the audio signal processing device to execute signal processing relating to a component, with respect to each component in the configuration of signal processing; a first display controller that causes a display to display a call screen for directly accepting a direction to display the first control screen; a second controller that disposes a duplication of an object in the first control screen into a second control screen editable by a user; an accepting device that accepts a direction to enable to recall the first control screen including an original of the object, with respect to the object disposed in the second control screen; and a second display controller that causes the display to display the call screen in a state in which a portion to be operated to display the first control screen including the original of the object relating to the direction, in accordance with the direction which the accepting device accepts.

Besides, still another control device of the present invention is a control device that causes an audio signal processing device having an audio signal processor wherein a processing content can be programmed to execute signal processing based on a configuration of signal processing having a plurality of components and wires connecting the components, including a first controller that prepares a first control screen having a control for setting a value of a parameter that is used when causing the audio signal processing device to execute signal processing relating to a component, with respect to each component in the configuration of signal processing; a current memory that stores values of parameters reflected in signal processing based on the configuration of signal processing; a second controller that disposes a duplication of the control in the first control screen into a second control screen editable by a user; an accepting device that accepts a direction to store and recall a parameter relating to the second control screen; a storing device that reads a parameter relating to each component corresponding to at least one of origins of controls disposed in the second control screen and causes a memory to store the parameter as a series of setting data relating to the second control screen, when the accepting device accepts the direction of store; and a recalling device that reads setting data relating to a direction from the memory when the above-described accepting device accepts the direction of recall, and writes a parameter in the setting data which relates to each component corresponding to at least one of the origins of the controls disposed in the second control screen into the current memory.

In the above-described control device, it is preferable that the above-described recalling device is a device that does not write a parameter into the current memory with respect to a component, if the component corresponds to at least one of the originals of the controls disposed in the second control screen and the parameter corresponding to the component is not included in the setting data which is read.

A computer program of the invention is a computer program including program instructions executable by a computer and causing the computer to function as any one of the above-described control devices The above and other objects, features and advantages of the invention will be apparent from the following detailed description which is to be read in conjunction with the accompanying drawings.

DETAILED DESCRIPTION OF THE PREFERRED EMBODIMENTS

Hereinafter, preferred embodiments of the invention will be concretely described with reference to the drawings.

Figure 1:
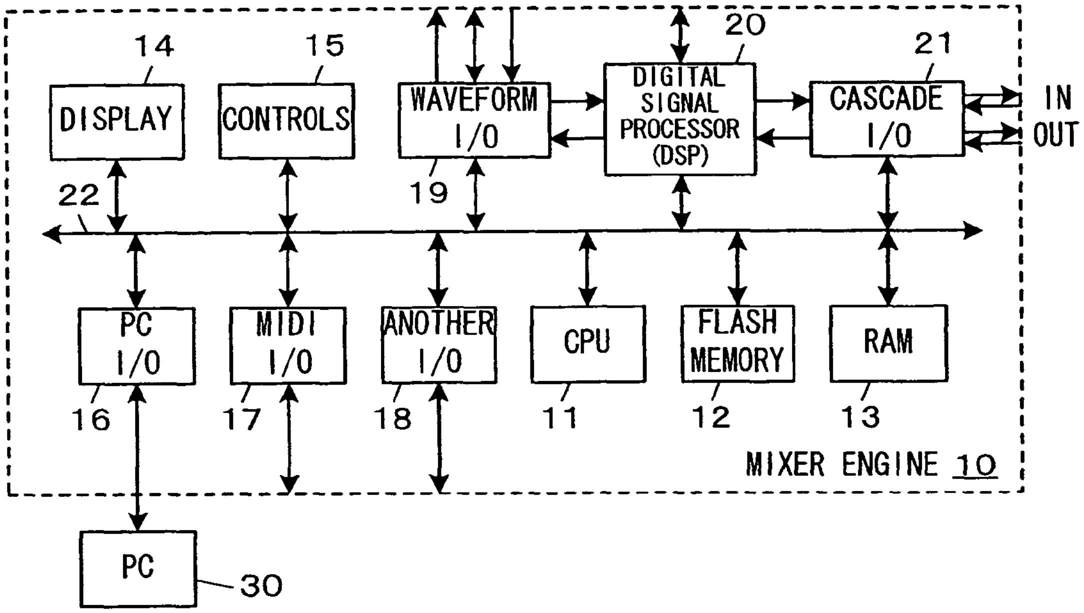
FIG. 1 is a block diagram showing a configuration example of a mixer system including a PC being an embodiment of a control device of the invention and a mixer engine being an audio signal processing device being a control target thereof.
Figure 2:
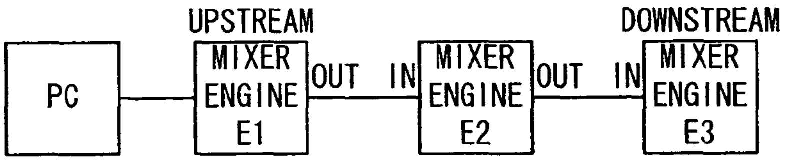
FIG. 2 is a block diagram showing a configuration example of the mixer system when a plurality of mixer engines are cascade-connected.

1. Basic Configuration of Mixer System of Embodiment: FIG. 1 and FIG. 2

A configuration example of a mixer system which includes a PC being a control device of the invention and a mixer engine being an audio signal processing device will first be described using FIG. 1. FIG. 1 is a block diagram showing the configuration of the mixer system.

As shown in FIG. 1, the mixer system comprises a mixer engine 10 and a PC 30. The PC 30 can employ, as hardware, a well-known PC having a CPU, a ROM, a RAM and so on and a display, that is, a PC on which an operating system (OS) such as Windows XP (registered trademark) runs. By executing a necessary control program as an application program on the OS, the PC 30 can function as the control device which edits a configuration of signal processing in the mixer engine 10, transfers the edit result to the mixer engine 10, and causes the mixer engine 10 to operate in accordance with the edited configuration of signal processing. The operation and function of the PC 30 described below should be realized by executing the control program unless otherwise stated.

On the other hand, the mixer engine 10 includes a CPU 11, a flash memory 12, a RAM 13, a display 14, controls 15, a PC input and output module (I/O) 16, a MIDI (Musical Instruments Digital Interface) I/O 17, another I/O 18, a waveform I/O 19, a digital signal processor (DSP) 20, and a cascade I/O 21, which are connected by a system bus 22. The mixer engine 10 has functions of generating a microprogram for controlling the DSP 20 in accordance with the configuration of signal processing received from the PC 30, operating the DSP 20 in accordance with the microprogram to thereby perform various signal processing on inputted audio signals and output them.

The CPU 11, which is a controller that comprehensively controls operation of the mixer engine 10, executes a predetermined program stored in the flash memory 12 to thereby perform processing such as controlling communication at each of the I/Os 16 to 19 and 21 and display on the display 14, detecting operations at the controls 15 and changing values of parameters in accordance with the operations, and generating the microprogram for operating the DSP 20 from data on the configuration of signal processing received from the PC 30 and installing the program in the DSP 20.

The flash memory 12 is a rewritable non-volatile memory that stores a control program executed by the CPU 11, later-described preset component data, and so on.

The RAM 13 is a memory that stores various kinds of data including later-described zone data generated by converting the data on the configuration of signal processing received from the PC 30 into a required form and current scene, and is used as a work memory by the CPU 11. Further, the zone data storage area of the RAM 13 is power-backed up so that the mixer engine 10 can be independently used.

The display 14 is a display composed of a liquid crystal display (LCD) or the like. The display 14 displays a screen for indicating the current state of the mixer engine 10, a screen for referring to, modifying, saving, and so on of later-described preset, and so on.

The controls 15 are controls composed of keys, switches, rotary encoders, and so on, with which a user directly operates the mixer engine 10 to edit preset and so on.

The PC I/O 16 is an interface for connecting the PC 30 thereto for communication, and capable of establishing communication via an interface of, for example, a USB (Universal Serial Bus) standard, an RS-232C standard, an IEEE (Institute of Electrical and Electronic Engineers) 1394 standard, an Ethernet (registered trademark) standard, or the like.

The MIDI I/O 17 is an interface for sending and receiving data in compliance with MIDI standard, and is used, for example, to communicate with an electronic musical instrument compatible with MIDI, a computer with an application program for outputting MIDI data, or the like.

The waveform I/O 19 is an interface for accepting input of audio signals to be processed in the DSP 20 and outputting processed audio signals. A plurality of A/D conversion boards each capable of analog input of four channels, D/A conversion boards each capable of analog output of four channels, and digital input and output boards each capable of digital input and output of eight channels, can be installed in combination as necessary into the waveform I/O 19, which actually inputs and outputs signals through the boards.

The another I/O 18 is an interface for connecting devices other than the above-described to perform input and output, and for example, interfaces for connecting an external display, a mouse, a keyboard for inputting characters, a control panel, and so on are provided.

The DSP 20 is a module which processes audio signals inputted from the waveform I/O 19 in accordance with the set microprogram and the current scene determining its processing parameters. The DSP 20 may be constituted of one processor or a plurality of processors connected.

The cascade I/O 21 is an interface for transmitting/receiving audio signals to/from other mixers, and data, command, and so on to/from the PC 30 when a plurality of mixer engines 10 are cascade-connected for use. When cascade-connection is performed, a plurality of mixer engines 10 can be cascade-connected from an upstream side to a downstream side to compose a mixer system as shown in FIG. 2. This connection is performed by connecting a cascade-out terminal of a mixer at the upstream side and a cascade-in terminal of a mixer at the downstream side with a cable (either dedicated/general-purpose may be used) for cascade connection.

Note that when the plurality of mixer engines 10 are used in cascade connection, the plurality of mixer engines 10 can cooperatively operate to perform a series of audio signal processing. Further, the PC 30 can edit the configuration of the above-described audio signal processing and transfer the edited result also to the other mixer engines 10 via the mixer engine 10 directly connected to the PC 30, thereby causing each of the mixer engines 10 to operate in accordance with the edited signal processing configuration.

In this case, it is preferable that the PC 30 divides the data indicating the configuration of signal processing and the values of the parameters into the parts corresponding to the respective mixer engines, so that the PC 30 transfers to each mixer engine the data in a range corresponding to each mixer engine. Alternatively, the PC 30 may transmit to all the mixer engines the data for all the mixer engines, and from that data, each mixer engine receiving that data may take data in the range corresponding to the own mixer engine.

2. Editing Scheme of Configuration of Signal Processing in PC of Embodiment: FIGS. 3 to 6

Figure 3:
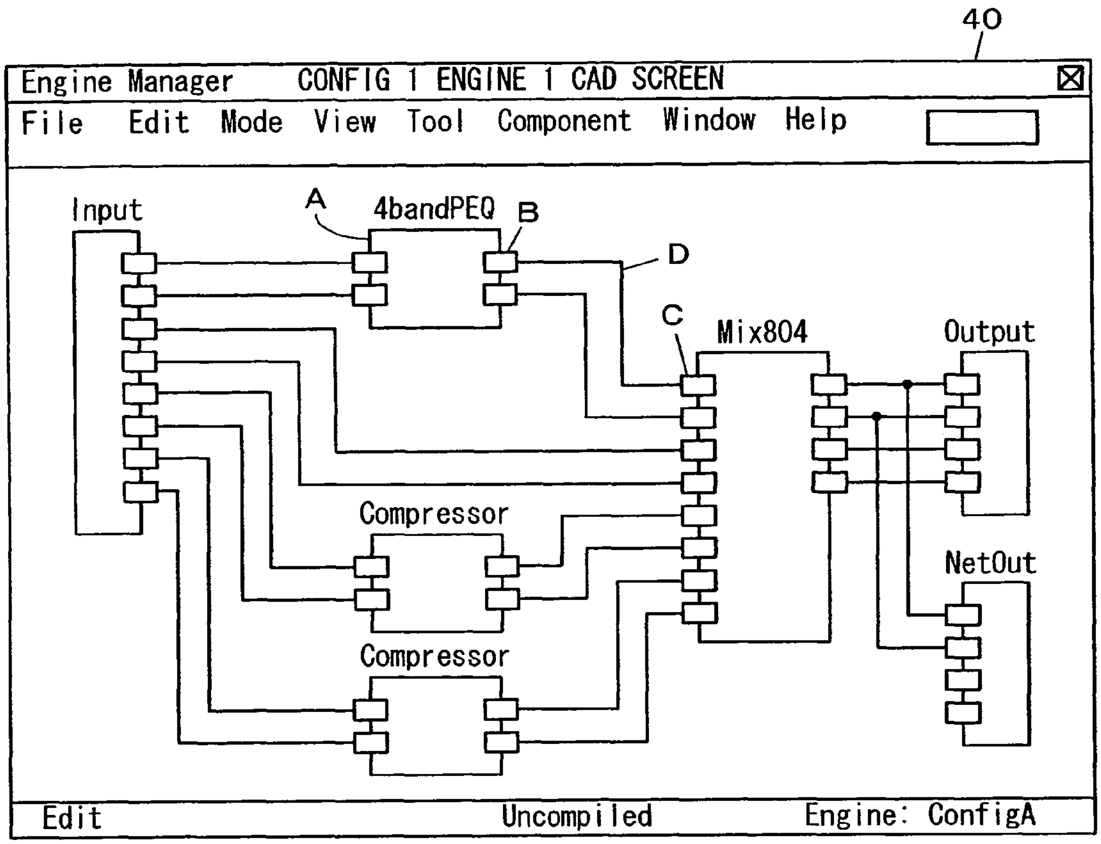
FIG. 3 is a diagram showing an example of a CAD screen displayed on a display of the PC shown in FIG. 1.

Next, an editing scheme of the configuration of signal processing in the PC 30 will be described. FIG. 3 is a diagram showing an example of an edit screen of a signal processing configuration displayed on the display of the PC 30.

When the user causes the PC 30 to execute the above-described control program and issues necessary directions, the PC 30 causes the display to display a CAD (Computer Aided Design) screen 40 as shown in FIG. 3 as a graphical edit screen to accept an edit direction from the user. In this screen, the configuration of signal processing during the edit is graphically displayed by components (A) such as a 4band-PEQ, a Compressor, a Mix804, and the like and a wire (D) connecting an output node (B) and an input node (C) of the components.

Note that the nodes displayed on the left side of the components are the input nodes, and the nodes displayed on the right side are the output nodes. The components which exhibit input to the mixer engine 10 have only the output nodes, the components which exhibit output from the mixer engine 10 have only the input nodes, and all the other components have both the input nodes and the output nodes.

In this screen, the user can select components desired to be added to the configuration of signal processing from a component list displayed by operation of a "Component" menu, arrange them on the screen, and designate wires between any of the output nodes and any of the input nodes of the plurality of components arranged, to thereby edit the configuration of signal processing.

Here, each node of the components of Input and Output exhibits an input/output channel of the waveform I/O 19, and each node of the Netout component exhibits a signal output to another mixer engine via the cascade I/O 21. Though not shown here, a Netin component which exhibits a signal input to the cascade I/O 21 from another mixer engine can be arranged.

When the signal processing configuration in which a plurality of mixer engines cooperatively operate to execute signal processing is edited, the CAD screen 40 is displayed on each mixer engine, and a signal processing configuration for each engine can be edited.

By directing execution of "Save" in a "File" menu, the result edited in the above CAD screen 40 is saved as a configuration (config). Further, by directing execution of "Compile" in the "File" menu, the data format of a part of the configuration data can be converted into the data format for the mixer engine, and then the configuration data can be transferred to and stored in the mixer engine 10.

Note that, the PC 30 calculates during the edit the amount of resource required for the signal processing in accordance with the configuration of signal processing on the screen, so that if the amount exceeds that of the resource of the DSP 20 included in the mixer engine 10 of which configuration of signal processing is edited, the PC 30 informs the user that such processing cannot be performed.

Further, the user can set either a non-online mode or an online mode as the operation mode of the mixer engine 10 and the PC 30. In the non-online mode, the mixer engine 10 and the PC 30 operate independently from each other, while, in the online mode, they operate maintaining mutual synchronization of parameters in the current scene, and so on. They can shift to the online mode only when the effective configuration of signal processing of the mixer engine 10 matches the effective configuration of signal processing of the PC 30. In the online mode, the mixer engine 10 and the PC 30 are controlled (synchronized) such that their data of the current scenes become identical.

Note that it is also adoptable to automatically shift the operation mode to the online mode at the time of execution of the above-described "Compile". When the configuration of signal processing is changed on the PC 30 side, it is preferable to automatically shift the operation mode to the non-online mode, which is adopted here. Alternatively, shift to the online mode may be separately directed by the operation of the user.

For each of the components included in the configuration of signal processing, a memory area for storing values of parameters (for example, level or the like of each input in the case of a mixer) which are used for signal processing related to the component is prepared in the current memory which stores the current scene, and predetermined initial values are given to the parameters, at a stage when the component is newly disposed in the configuration of signal processing, or at a stage when compile is performed after the component is disposed.

Thereafter, the user can edit the values of the parameters stored in the parameter memory area, by operating the control screen prepared for each component. The values of the parameters edited here can be stored as preset in the library as will be described later.

Figure 4:
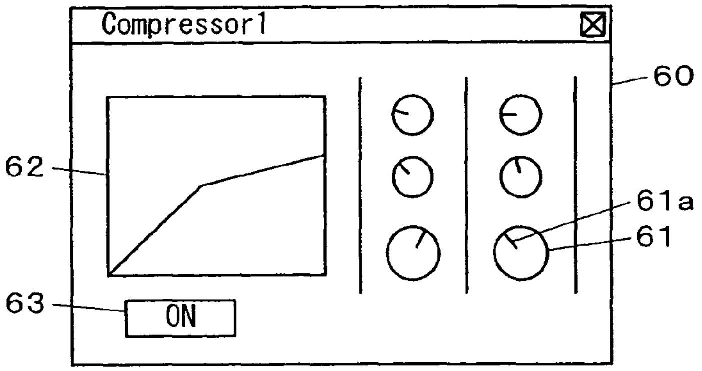
FIG. 4 is a diagram showing a display example of a control screen of the same.

FIG. 4 shows a display example of the control screen. FIG. 4 shows an example of the control screen for Compressor 1.

This control screen 60 is composed by arranging various members such as a knob 61, a graph display portion 62, a key 63, and so on in a frame of the screen. The user can set values of the parameters related to the component corresponding to the control screen 60 by operating the controls such as the knob 61, the key 63, and so on by using a pointing device or a key board. The values and contents of the parameters can be confirmed by being displayed on the display portion as the graph display portion 62.

As the object which is disposed in the control screen 60, the controls and the display portion as described above are mainly conceivable, but labels and the like on which only fixed characters are simply described are also conceivable. The controls are not limited to those shown in FIG. 4, and a slider and a rotary encoder may be adopted. The controls which do not imitate physical controls, such as a pull-down menu, a radio button and the like, may be adopted. As for the display portion, the graph display portion 62, which shows by graph the characteristics of the compressor corresponding to the values of a plurality of parameters designated by a plurality of knobs, is shown as an example, but various display portions such as the ones showing the value of one parameter by numeral value and graph, the ones showing on/off by bright/dark, and so on are conceivable. Further, it may be suitable to make it possible to set values of parameters by inputting the values of the parameters to a display portion.

Such a control screen is a first control screen.

It is conceivable that the control screen 60 as shown in FIG. 4 is displayed (recalled) when the corresponding component is directly double-clicked in the CAD screen 40 as shown in FIG. 3, for example. With this method, however, only the components in the CAD screen displayed on the front can accept a recall direction of the control screen. Therefore, it is advisable to prepare a call screen for directly accepting a direction to display a control screen, other than this.

Figure 5:
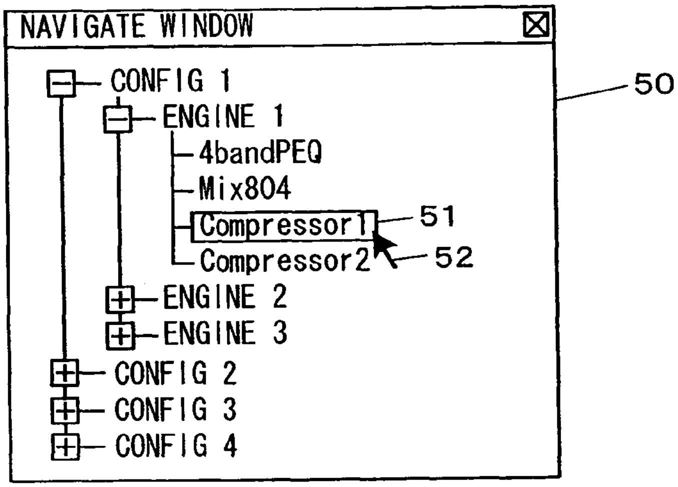
FIG. 5 is a diagram showing a display example of a navigation window of the same.

FIG. 5 shows a display example of a navigate window which is such a call screen.

In this navigate window 50, each component in each configuration of signal processing edited by the user is classified according to each configuration and engine it belongs to, and is hierarchically displayed in a tree form. Note that the parts of which details are not displayed in the example shown in FIG. 5, for example, the content of the configuration 2 and the like can be displayed if display of the details of such portions is directed.

In this navigate window 50, the user can recall the control screen for the component by positioning a pointer 52 in a specified component and clicking on it. Namely, the user can direct the recall of the control screen directly without performing an operation of recalling a CAD screen including the component and so on.

In this mixer system, the user can call the control screen for each component by directing from the navigate window 50, and by the controls in the called control screen, the user can set the values of various parameters for use in signal processing.

In this mixer engine, however, a user control screen which is a second control screen editable by a user is prepared other than the control screen for each component.

Here, the user control screen will be described using FIG. 6.

The user control screen is a control screen in which a duplication of any object in any control screen can be disposed at any position. Duplication and disposition of an object can be performed by dragging and dropping the object from the control screen 60 to a desired position on a user control screen 70, as shown in FIG. 6, for example. Other than this, duplication of an original object may be directed on the control screen 60, and paste may be directed on the user control screen 70. Further, it is possible to move the disposed object optionally in the user control screen 70.

Each object disposed on the user control screen 70 as described above can be made to function in the same manner as the original object. For example, when a knob 71 is operated in the user control screen 70, the value of the parameter corresponding to the original knob 61 in the control screen 60 is changed in accordance with the operation. The display of the display portion such as the graph display portion 62 which performs display corresponding to the content of the parameter is changed to the display showing the changed value. The knob 61 itself shows the value of a parameter by the position of a mark 61*a*, and therefore, the display of the knob 61 is also changed.

The objects which can be duplicated and disposed on the user control screen 70 are not limited to the controls, but they may be other objects such as display portions, labels and the like. As for the labels, unique ones can be also disposed on the user control screen 70. It goes without saying that in the same configuration, objects may be duplicated from a plurality of control screens. A store key 72 and a recall key 73 are not duplications of other controls, but the default controls which are uniquely disposed on the user control screen 70 by default. The store key 72 is a key for directing store of the parameters related to the user control screen 70, and the recall key 73 is a key for directing recall of the parameters related to the user control screen 70. However, it is not indispensable to provide the store key 72 and the recall key 73.

Such a user control screen 70 may not be created at all, or if the user directs the creation, any number of user control screens 70 can be created.

Origins (duplication origins) of the objects disposed in the user control screen as above are actually objects in any of the control screens, but in the following explanation, a component on the CAD screen corresponding to the control screen including the original object is called an “original” component to simplify the explanation.

3. Configuration of Data for Use in Mixer System of Embodiment: FIG. 7A to FIG. 10

The configuration of data associated with the invention for use in the above-described mixer system will be described below.

The configuration of data for use on the PC 30 side will be shown in FIG. 7A to FIG. 9.

When the above-described control program is executed on the OS of the PC 30, the PC 30 stores each data shown in FIG. 7A to FIG. 9 in a memory space defined by the control program.

Figure 7A:
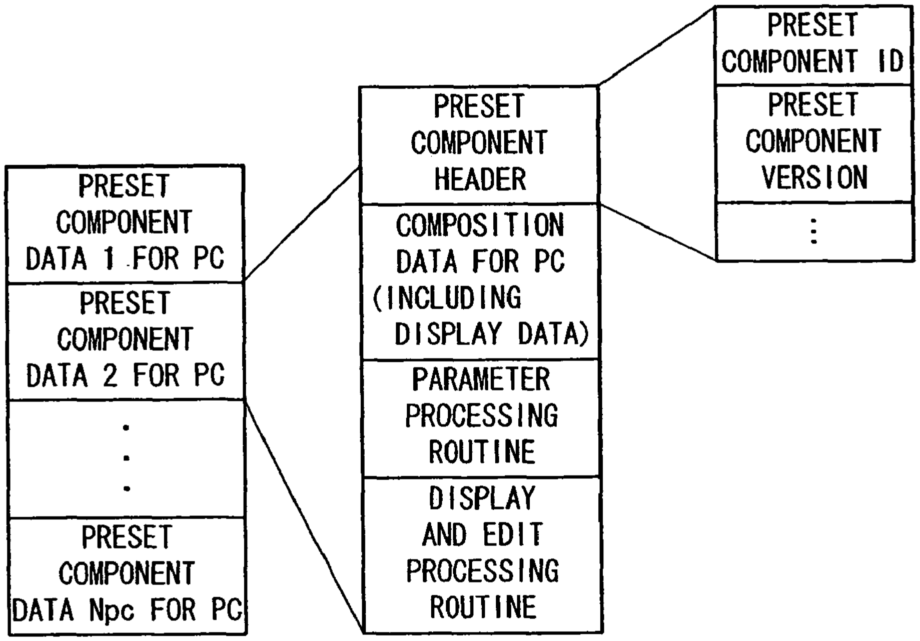
FIG. 7A to FIG. 7C are diagrams each showing a part of a composition of data used on the PC side in the mixer system shown in FIG. 1.

Among them, the preset component data for PC shown in FIG. 7A is a set of data on components which can be used in editing signal processing and basically supplied from its manufacturer, although it may be configured to be customizable by the user. The preset component data for PC is prepared for each kind of components usable for signal processing.

Each preset component data for PC, which is data indicating the property and function of a component, includes: a preset component header for identifying the component; composition data showing the composition of the input and output of the component and data and parameters that the component handles; a parameter processing routine for performing processing of changing the value of the individual parameter of each component in the above-described current scene or preset in accordance with the numerical value input operation by the user; and a display and edit processing routine for converting the values of the parameters of each component into text data or a characteristic graph for display.

The preset component header includes data on a preset component ID being identification data indicating the kind of the preset component and a preset component version indicating its version, with which the preset component can be identified.

The above-described composition data also includes: the name of the component; display data indicating the appearance such as color, shape, and so on of the component when the component itself is displayed in the CAD screen, the design of the control screen for editing the values of the parameters of that component, that is, the arrangement of the knobs and the characteristic graph on the control screen; and so on, as well as the input and output composition data indicating the composition of the input and output of the component, and the data composition data indicating the composition of data and parameters that the component handles.

Among the preset component data for PC, the display data necessary for editing in the CAD screen in graphic display in the composition data, the routine for displaying the characteristics in a graph form on the control screen in the display and edit processing routine, and so on, which are not required for the operation on the mixer engine 10 side, are stored only on the PC 30 side.

Figure 8:
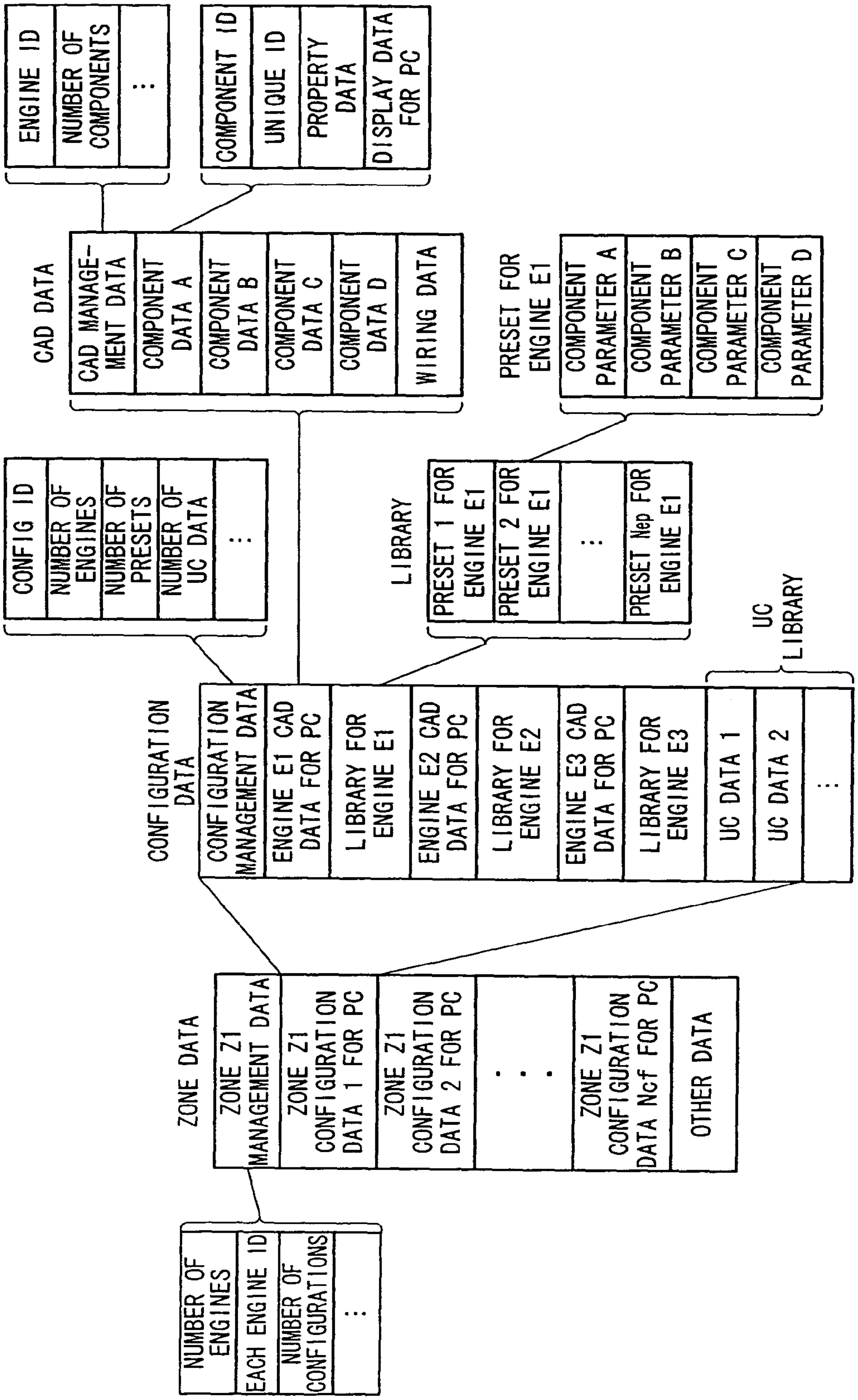
FIG. 8 is a diagram showing another part of the configuration of the data.

Zone data shown in FIG. 8 includes management data, one or a plurality of configuration data for PC, and the other data. The user can direct to store the entire zone data as one file into the hard disk and conversely, can direct to read out the data from the hard disk to the RAM.

Among the above zone data, the management data includes data such as the number of engines indicating the number of mixer engines belonging to the zone indicated by the zone data, each engine ID indicating the ID of each of the mixer engines, the number of configurations indicating the number of configuration data included in the zone data, and so on.

The configuration data is the data indicating the content of the configuration of signal processing that the user edits, and when the user selects store of the edit result, the content of the configuration of signal processing at that point of time is stored as one configuration data for PC. Each configuration data for PC has CAD data for PC and a library for each of the mixer engines belonging to the zone, and in addition to this, has configuration management data, and a user control (UC) library. Here, configuration data relating to the configuration of signal processing which is executed by the engines E1 to E3 shown in FIG. 2 is shown.

Among these data, the configuration management data includes data such as a configuration ID uniquely assigned to configuration data when the configuration data is newly stored, the number of engines indicating the number of mixer engines which perform audio signal processing in accordance with the configuration data (usually, the number of mixer engines belonging to the zone indicated by zone data), the number of presets indicating the number of presets in the library of each engine, the number of UC data indicating the number of UC data in the UC library, and so on.

Besides, each CAD data for PC is composition data indicating the content of the part taken charge of by one mixer engine among the edited configuration of signal processing. The CAD data for PC includes CAD management data, component data on each component of the part, which is executed (taken charge of) by a target mixer engine, among the edited configuration of signal processing, and wiring data indicating the wiring status between the components. Note that if a plurality of preset components of the same kind are included in the edited configuration of signal processing, discrete component data is prepared for each of them.

Further, CAD management data includes data of an engine ID which is the ID of a mixer engine that executes signal processing in accordance with the configuration of signal processing indicated by the CAD data for PC, and the number of components indicating the number of component data in the CAD data for PC.

Each component data includes: a component ID indicating what preset component that component corresponds to; a unique ID being ID uniquely assigned to that component in the configuration in which that component is included; property data including data such as the number of input nodes and output nodes of that component and so on; and display data for PC indicating the position where the corresponding component is arranged in the CAD screen on the PC 30 side and so on. Data of component version may be included in the component data as the data for identifying a preset component.

Besides, the wiring data includes, for each wiring of a plurality of wirings included in the edited configuration of signal processing: connection data indicating what output node of what component is being wired to what input node of what component; and display data for PC indicating the shape and arrangement of that wiring in the edit screen on the PC 30 side.

The library is an aggregation of presets which is a set of values of parameters for use when a mixer engine executes audio signal processing indicated by the corresponding CAD data for PC. The number of presets is optional, and it may differ for each engine, and may be zero.

Each preset includes a component parameter which is an aggregation of the values of parameters corresponding to each of the components for processing executed in the mixer engine. The format and arrangement of the data in each component parameter are defined by data composition data in the preset component data for PC of the preset component identified by the component ID of the component included in the CAD data for PC, and property data of the component included in the CAD data for PC.

Figure 6:
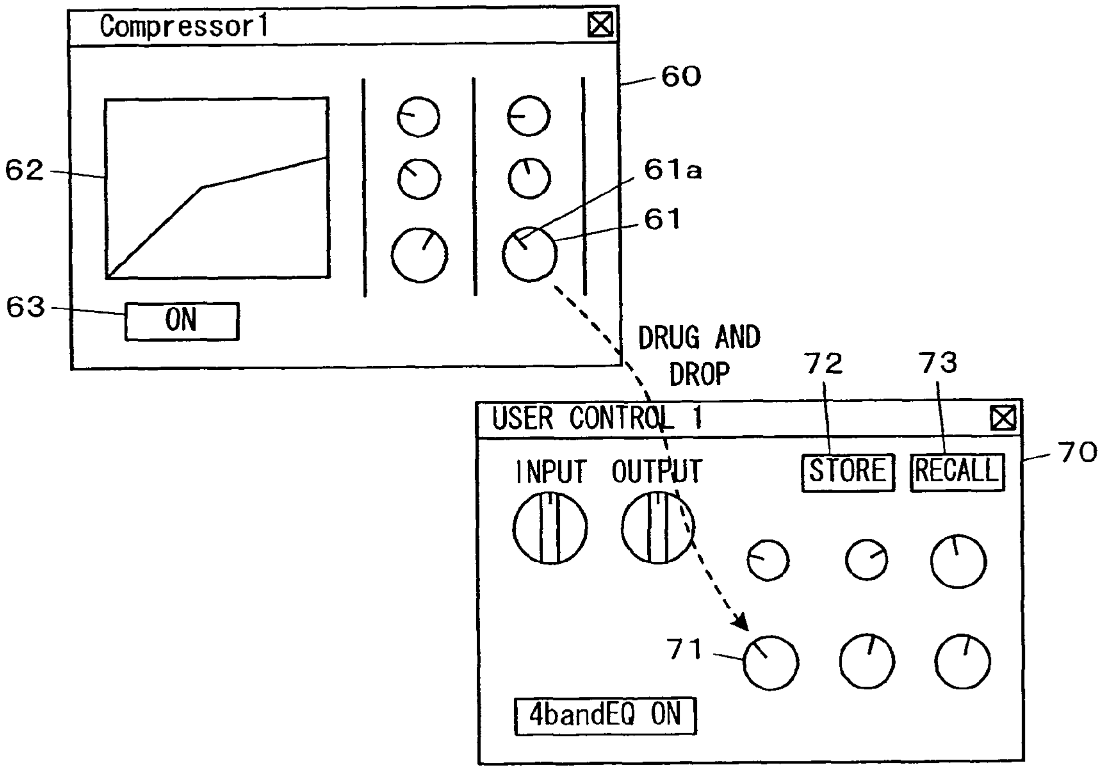
FIG. 6 is a diagram for explaining a user control screen of the same.

Besides, the UC library is an aggregation of UC data which is data related to the user control screen described by using FIG. 6, and one UC data is created for one user control screen created by the user.

Figure 9:
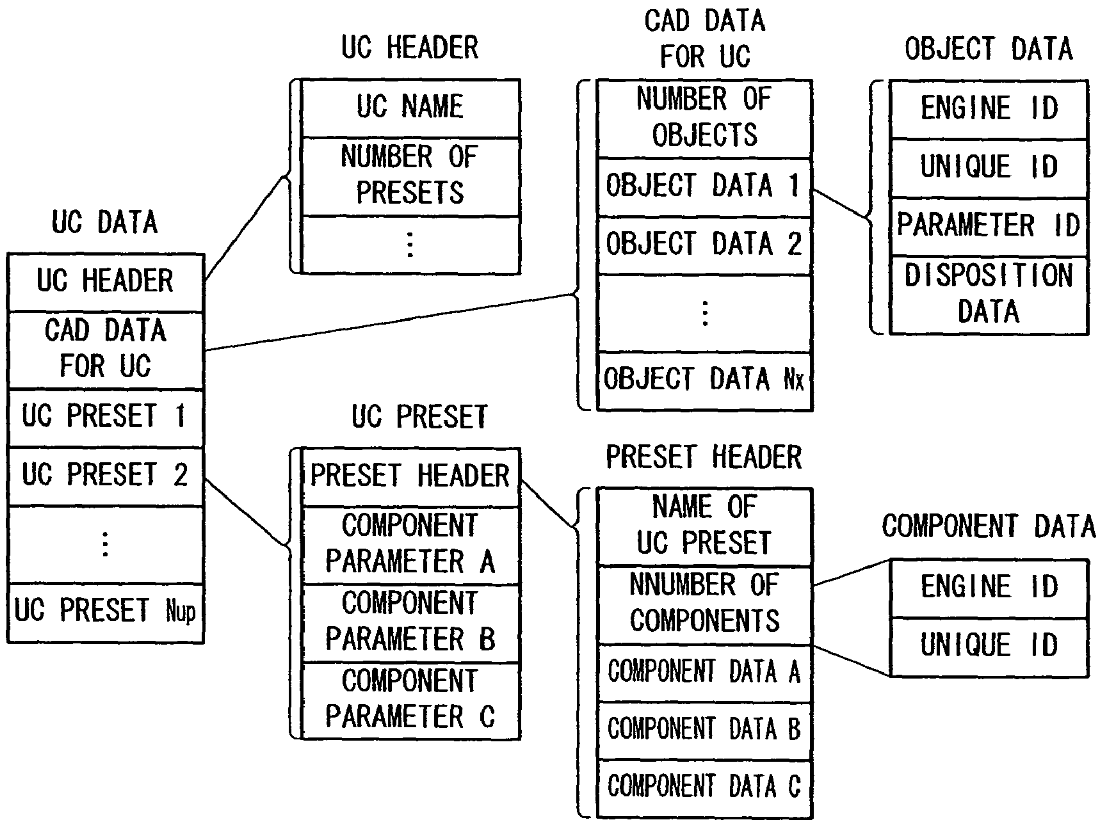
FIG. 9 is a diagram showing the configuration of UC data shown in FIG. 8 more specifically.

FIG. 9 shows a more detailed configuration of the UC data.

As shown in FIG. 9, the UC data has a UC header, CAD data for UC and a UC preset.

The UC header includes data of a UC name indicating a name of the user control screen, and the number of presets indicating the number of UC presets in the UC data.

Besides, the CAD data for UC has data of the number of objects indicating the number of objects disposed on the user control screen, and object data indicating a position, a shape and an origin of each object.

The object data is prepared for each of the disposed objects. An original object is identified by the engine ID, unique ID and parameter ID, and the position and the shape on the user control screen are identified by the disposition data. Note that the engine ID and the unique ID correspond to IDs included in the CAD data for PC in the same configuration data, and the parameter ID corresponds to an ID which is used for definition of a parameter and a control screen and included in composition data for PC in the preset component data, though not shown. Note that in the case of a label and the like, the parameter ID does not necessarily indicate the kind of the parameter, and is an ID for simply discriminating the objects in some cases.

Besides, the UC preset is a set of values of parameters related to the user control screen 70, which is stored in response to press of the store key 72 shown in FIG. 6. As the "related" parameters, parameters related to the component which is the origin of at least one control in the user control screen 70 are stored as one UC preset which is a series of setting data.

Note that objects disposed on other user control screens can be duplicated and disposed on the user control screen, but in such a case, the origin back to the control screen is registered as the origin of the object in the object data, and the above-described "relation" is defined based on the origin back to the control screen.

As each UC preset, the values of the parameters related to the user control screen 70 at the time of the storing is stored, and when the objects in the user control screen 70 are added and deleted halfway, the kind of parameters included for each UC preset can differ.

Further, each UC preset includes a preset header, and a component parameter which is a set of values of the parameters relating to each component identified by the preset header. The preset header designates a specific component in the CAD data for PC by the component data including the engine ID and unique ID, and by the preset component data corresponding to the component ID of that component, the data format of one component parameter is defined. At this time, it is possible to designate components over a plurality of mixer engines.

The data format of each component parameter in the UC preset is the same as the data format of the preset component in a library or current scene if they are for the same component.

The preset header includes data of the number of components indicating the number of component parameters (the same as the number of component data) included in the UC preset, and data of the UC preset name indicating the name of the UC preset.

The above-described data may be stored in a nonvolatile memory such as a HDD (hard disk drive), and may be read to the RAM for use as necessary.

Figure 7B:
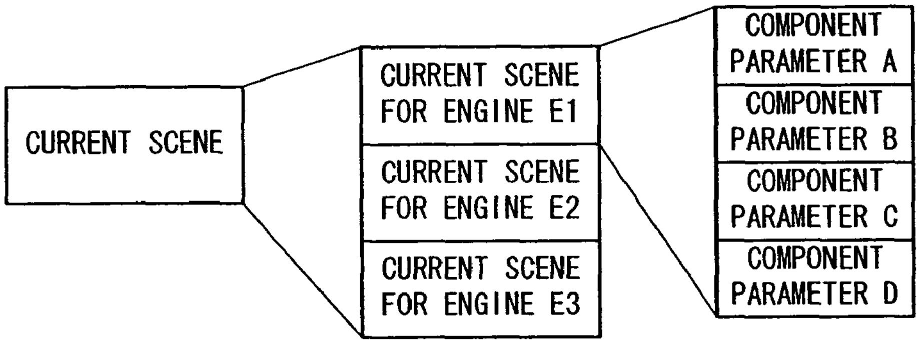

Besides, the PC 30 stores a current scene indicating values of the currently effective parameters in the currently effective configuration as shown in FIG. 7B. The data of the current scene has a composition made by connecting presets for each engine in the currently effective configuration. Namely, the data of the current scene has a format combining a component parameter of each component in the configuration of signal processing in the configuration. When the value of a parameter relating to a component in the configuration of signal processing is set by a control or the like on the control screen or the user control screen, the value of the parameter is changed in the current scene. The result can be stored as a preset for each engine a UC preset corresponding to the user control screen.

Figure 7C:
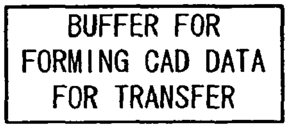

The PC 30 is provided with a buffer for forming, from the CAD data for PC, a CAD data for transfer to engine in the format suitable for the processing in the mixer engine 10 when transferring the configuration data to the mixer engine 10 in the above-described "Compile" processing as shown in FIG. 7C. The CAD data for transfer to engine to be transferred to each mixer engine is formed by deleting data which are not used on the mixer engine 10 side, such as the above-described display data for PC of the component and wiring, from the CAD data for PC, and packing the remaining data by cutting down the unused portions between data.

Note that data stored on the mixer engine 10 side are omitted in the drawing because they are not much related to the characteristics of this embodiment, and it is similar to the data which are stored on the PC 30 side in principle.

As the main points of difference, the point that the data stored on the mixer engine 10 side include in preset component data a microprogram for causing the DSP 20 to operate and function as the component, in place of a part of the display and edit routine, the point that the CAD data is the memorized above-described CAD data for transfer to engine, the point that it does not include the UC data, the point that the buffer for forming the microprogram which is executed by the DSP 20 based on the CAD data for engine, and the like are cited. Besides, as for the CAD data and library, only the CAD data and library in the range which the mixer engine 10 storing the data takes charge of among the entire configuration of signal processing are stored.

Figure 10:
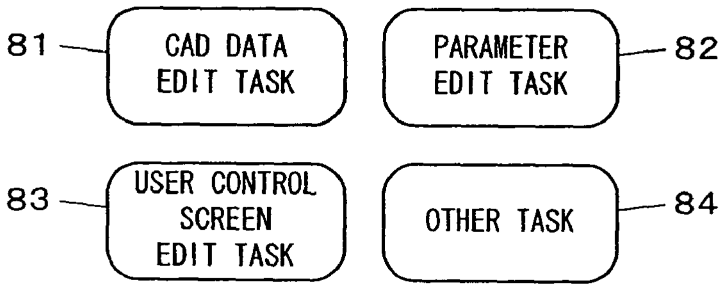
FIG. 10 is a diagram showing an example of a task executed by the PC shown in FIG. 1 in association with edit of the data shown in FIG. 7A to FIG. 9.

Next, examples of the tasks executed by the PC 30 in association with edit of the data shown in FIG. 7A to FIG. 9 are shown in FIG. 10.

As shown in FIG. 10, the PC 30 executes a CAD data edit task 81, a parameter edit task 82, a user control screen edit task 83, and the other task 84, as the tasks for editing the zone data and the current scene shown in FIG. 7A to FIG. 9.

The CAD data edit task 81 is the task of performing processing of editing the CAD data in accordance with the directions such as addition, deletion, change, and so on of a component and wiring on the CAD screen 40. When such edit is performed during operation in the online mode, the PC 30 shifts to the offline mode, which is as described above.

Besides, as an operation accepting mode in the control screen 60 and the user control screen 70, an execution mode and an edit mode are prepared. The execution mode is the mode for setting the values of parameters by the controls on these screens, and the edit mode is the mode for performing addition, deletion, position change, and so on of an object to/from/in the user control screen 70 by drag and drop, and so on.

The parameter edit task 82, which is the task of performing processing of changing the value of a parameter in accordance with the operation of a control in the execution mode, performs change of the data in the current scene stored in the current memory, and directs a similar data change to the necessary mixer engine in the online mode. The parameter edit task 82 also performs the operation of store and recall of parameters corresponding to the user control screen 70.

The user control screen edit task 83 is the task of performing processing of editing the UC data in accordance with the direction such as addition, deletion, position change and the like of a object in the edit mode. As for the UC data, the UC data is not stored on the mixer engine 10 side, and therefore, change of this does not influence the consistency of data. Therefore, it is possible to change the UC data even in the online mode without changing the mode.

The other task 84 is the task of performing compile of configuration data, switch of the operation mode, and so on.

4. Display Function of Original Control Screen of Each Object Disposed on User Control Screen: FIG. 11 to FIG. 14

One of the characteristic points in the mixer system as described above is the point that in the PC 30, the original control screen 60 of each object disposed on the user control screen 70 can be displayed by a simple operation. Next, an operation related to this point will be described.

First, a method for directing display of the original control screen 60 will be described by using FIG. 11.

In this mixer system, when a user moves a pointer 78 to any object on the user control screen 70 on the display and performs a predetermined operation (for example, click of the right mouse button), a menu 77 for directing functions relating to the component is displayed in the vicinity of the object. By performing the operation of selecting "Open Original" (for example, click of the left mouse button) in this menu 77, the direction to open the control screen 60 including the original of the object for which the menu 77 is displayed can be performed. This menu 77 corresponds to a control for accepting the direction to display the control screen including the original object.

Figure 11:
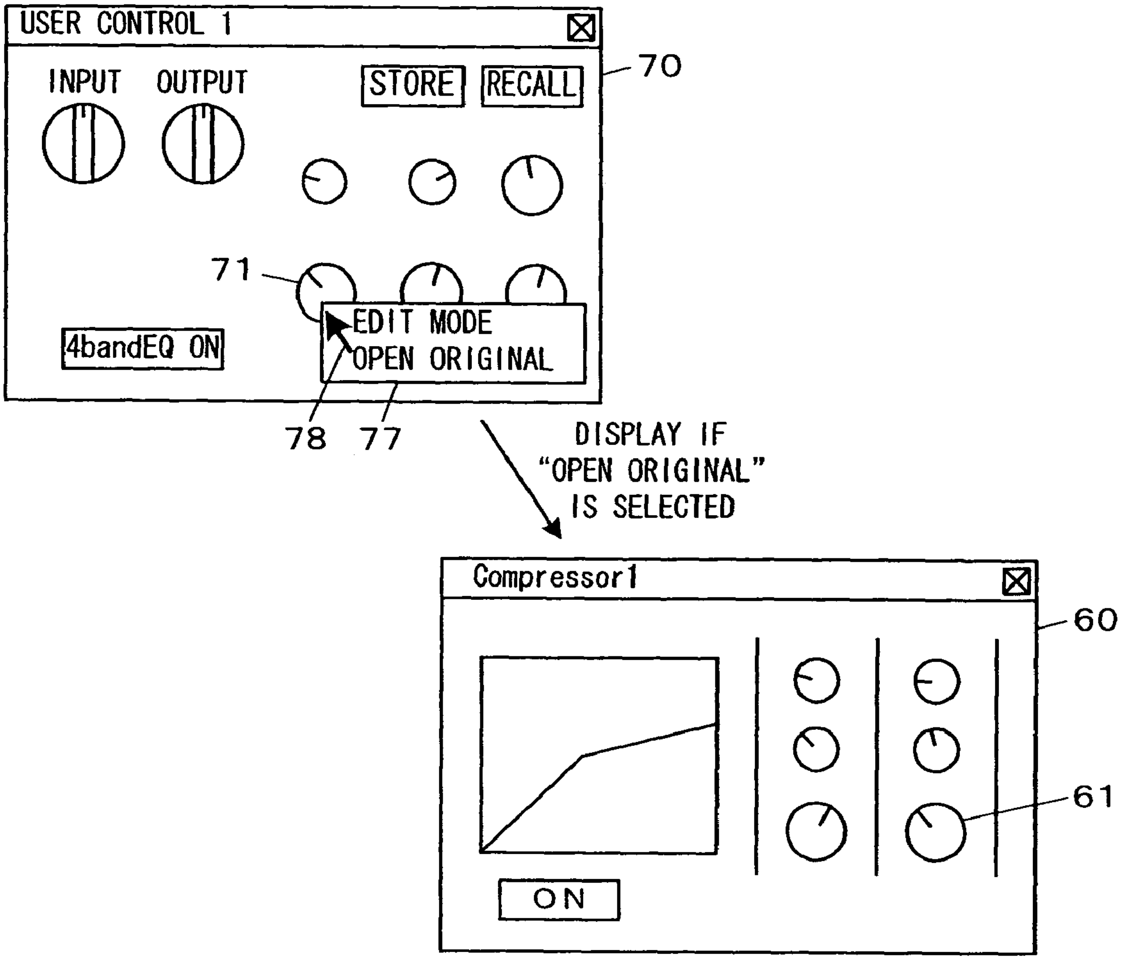
FIG. 11 is a diagram for explaining a method for directing display of an original control screen of an object in the user control screen shown in FIG. 6.

FIG. 11 shows an example of the case where the right mouth button is clicked on the knob 71, and when the user positions the pointer 78 on "Open Original" in the menu 77 and performs a left-click operation of the mouse, the control screen 60 including the knob 61 which is the origin of the knob 71 can be displayed on the display of the PC 30. If the control screen 60 is not displayed at all, the PC 30 newly displays the screen, and if all or a part of the screen is hidden by another screen, the PC 30 moves the control screen 60 to the forefront.

In this mixer system, by providing such a function, the control screen including the original of the object disposed on the user control screen can be displayed on the display by the simple operation. By utilizing this function, an object related to the object already disposed on the user control screen, for example, the knob for controlling the related parameter, the display portion which displays the value of the parameter controlled by the knob already disposed, and the like can be disposed on the user control by a simple operation, in the edit mode. In the execution mode, operation of the control related to the object already disposed on the user control screen, reference to the related display portion and so on can be performed by a simple operation.

Accordingly, operability in use of the user control screen can be enhanced. Especially by displaying the menu 77 in the vicinity of the directed object, the pointer 78 needs to be moved by only a small distance, and therefore, a large effect is brought about in enhancement of operability.

Note that objects disposed on other user control screens can be duplicated and disposed on the user control screen, but in such a case, the origin back to the control screen may be registered as the origin of the object in the object data, and a screen which is displayed may be the screen including the origin back to the control screen.

Besides, the item of "Edit Mode" in the menu 77 is for accepting the direction to shift the operation mode from the execution mode to the edit mode. During the operation in the edit mode, this item indicates "Execution Mode" so that the direction to shift to the execution mode can be accepted.

Figure 12:
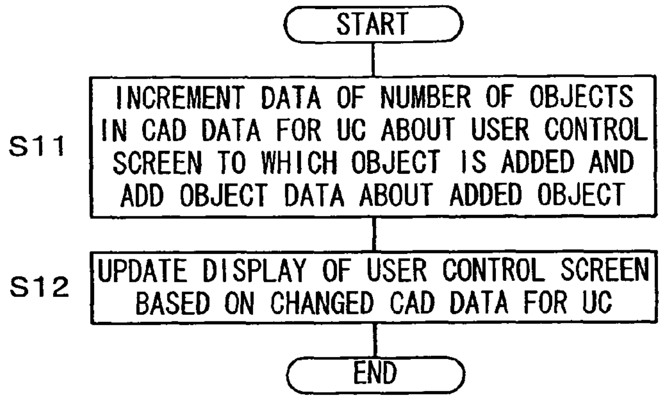
FIG. 12 is a flowchart of processing executed by a CPU of the PC when addition of an object to a user control screen is directed.
Figure 13:
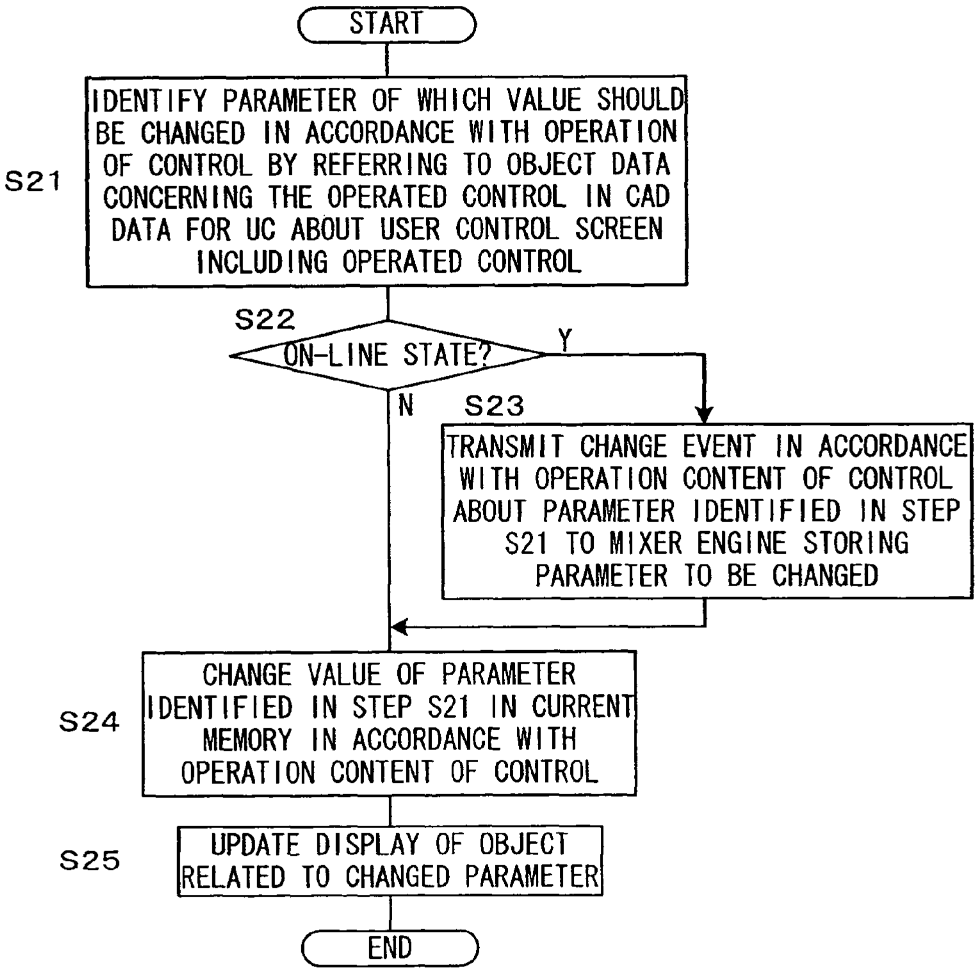
FIG. 13 is a flowchart of processing executed by the same when a control on a user control screen is operated.
Figure 14:
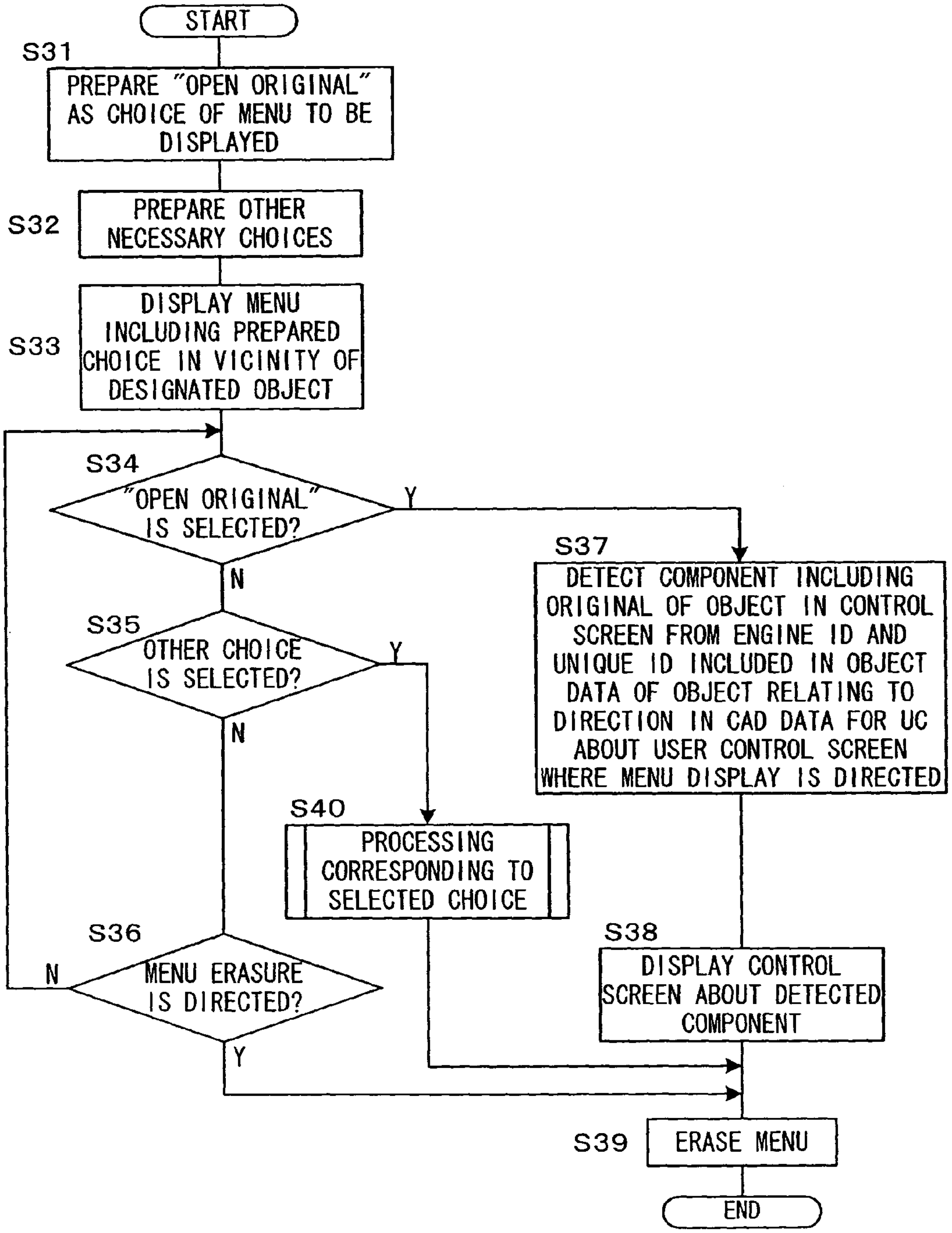
FIG. 14 is a flowchart of processing executed by the same when display of a menu about an object in a user control screen is directed.

Next, a flowchart of the control processing related to the user control screen will be shown in FIG. 12 to FIG. 14.

First, FIG. 12 shows a flowchart of the processing which the CPU of the PC 30 executes when addition of an object to a user control screen is directed.

The CPU of the PC 30 starts the processing shown in the flowchart in FIG. 12 when addition of an object to a user control screen is directed by drag and drop, paste or the like. Direction of addition of a object includes the direction of duplication of the original object.

In this processing, data of the number of objects in the CAD data for UC about the user control screen to which the object is added is incremented, and the object data about the added object is added to the CAD data for UC (S11). At this time, each ID described in the added object data can be determined by referring to data relating to the component corresponding to the original control screen 60, and the disposition data can be determined by referring to the data at the time of the direction of addition, such as the position to which addition is directed and so on.

After this processing, the display of the user control screen is updated based on the changed CAD data for UC (S12), and the processing ends.

The processing when deletion and change of an object are directed is omitted in the drawings, and the content of change in the CAD date for UC in Step S11 only differs in accordance with the direction, and the same processing is performed in the other respects. By performing the processing as above, the user can optionally edit the user control screen.

Next, FIG. 13 shows a flowchart of the processing which the CPU of the PC 30 executes when a control on a user control screen is operated.

When a control disposed on a user control screen is operated, the CPU of the PC 30 starts the processing shown in the flowchart in FIG. 13. Note that in this processing, all objects capable of directing to change the values of the parameters by operation are controls even if they have the other functions such as the display portion and so on.

In this processing, the CPU first identifies the parameter of which value should be changed in accordance with the operation of the control by referring to the CAD data for UC about the user control screen including the operated control (S21), and if it is in the on-line state, the CPU transmits the change event in accordance with the operation content of the control concerning the identified parameter to the mixer engine 10 which stores the parameter to be changed (S22, S23). As a matter of course, the CPU may transmit the change event with the engine ID of the mixer engine, which is to receive the event, attached to the change event, so that it may be determined whether to receive the data or not on the received mixer engine side. To which mixer engine the change event should be transmitted is recognizable by the engine ID in the object data of the operated control.

Thereafter, the CPU changes the value of the parameter in the current memory in accordance with the operation content of the control (S24), and updates the display of the object related to the changed parameter (S25), and the processing ends. Note that as the target of the update in Step S25, display of the operated control itself, display of the display portion displaying the content of the changed parameter, display of the original control of the operated control and so on are cited.

Besides, the CPU performs processing of changing the value of the parameter in the current memory on the mixer engine 10 side in accordance with the event transmitted in Step S23 though the processing on the mixer engine 10 side is omitted in the drawings. Though the UC data is not stored on the mixer engine 10 side, the received event is the change event of the specific parameter, and therefore, it is not necessary to refer to the UC data to perform the processing corresponding to this event.

By the above-described processing, the value of a parameter in the current memories of the PC and mixer engine is changed in accordance with the operation of the control on the user control screen, and the display corresponding to the changed value can be performed.

Next, FIG. 14 shows a flowchart of the processing which the CPU of the PC 30 executes when display of the menu is directed for an object in a user control screen.

The CPU of the PC 30 starts the processing shown in the flowchart in FIG. 14 when an object in a user control screen is designated and display of the menu is directed by the click of the right mouse button or the like.

The CPU first prepares "Open Original" and the other necessary ones as the choices (S31, S32), and displays the menu including the choice as shown in FIG. 9 in the vicinity of the object specified in the display (S33). Thereafter, the CPU waits until any one of the choices is selected or menu erasure direction is issued (S34 to S36).

When the choice of "Open Original" is selected, the CPU detects the component including the original of that object in its control screen by the engine ID and the unique ID included in the object data of the object relating to that direction in the CAD data for UC about the user control screen in which the display of the menu is directed (S37), causes the display to display the control screen about the detected component (S38), and erases the menu displayed in Step S33 (S39), and the processing ends.

Note that the detection in Step S37 can be performed by referring to each component data in the CAD data for PC of the engine identified by the engine ID, and retrieving the component having the corresponding unique ID. The display in Step S38 can be performed based on the configuration data for PC in the preset component data about the detected component.

In the above processing, the CPU of the PC 30 functions as an accepting device in Steps S33 and S34, and the CPU functions as a display controller in Steps S37 and S38.

When a choice other than "Open Original" is selected, the CPU performs processing corresponding to the selected choice (S40), and erases the menu (S39), and the processing ends. As this processing, for example, change of the operation mode between the edit mode and the execution mode is conceivable.

When a menu erasure direction is issued, the CPU directly erases the menu (S39), and the processing ends. This direction can be performed by clicking the mouse on the portions other than the menu in the user control screen, for example.

By performing the above-described processing, the function as described by using FIG. 11 is realized, and the above-described effects can be obtained.

It is also possible to perform the acceptance of a display direction of the control screen by other things than the menu as shown in FIG. 11. For example, a list of the objects disposed in the user control screen may be displayed, and any object may be selected from them, whereby display of the control screen including the original of that object may be directed. Such display direction may be possible only for some of the objects, for example, only the controls.

Alternatively, an independent "Open Original" button may be provided, and after operating the button, any object may be selected by a mouse or the like, or conversely, any object may be selected first, and thereafter, the "Open Original" button may be operated, and the like, so that the display of the control screen including the original of the selected object may be directed. Alternatively, it may be made possible that by simply double-clicking on any object, display of the control screen including the original object is directed.

When the control screen is displayed in accordance with the direction such as "Open Original" and so on, the cursor 51 may be moved to the position of the component corresponding to the displayed control screen in the navigate window 50. In this manner, the user can easily recognize what component of which mixer engine the displayed control screen corresponds to.

Besides, instead of directly directing the display of the control screen, it may be suitable to make it possible to direct to establish a state in which the control screen can be recalled (displayed). In this case, the method of direction is the same as in the case of FIG. 11 and the like. However, when the direction is issued, for example, the navigate window 50 as shown in FIG. 5 is displayed on the forefront screen of the display, the cursor 51 is moved to the position indicating the component corresponding to a control screen to be recalled, and the portion to be operated to display the control screen is shown. At this time, when the tree is in the state in which it does not display the target component, the tree may be expanded to be in the state displaying the target component.

In this manner, the user can direct the PC 30 to display the control screen including the original object on the display by only clicking or the like on the position shown by the cursor 51 after directing via the menu 77. In this case, sufficiently high operability can be obtained, though the operation increases by one action as compared with the case performing the processing shown in FIG. 14.

Besides, if the pointer 52 is moved to the position of the cursor 51 at the same time in this case, the operation of moving the pointer is eliminated when the control screen is opened, and therefore, higher operability can be obtained. Instead of moving the cursor 51, only the position of the pointer 52 can indicate the portion to be operated. Alternatively, instead of the display of the cursor 51, display of a change in text color, a change in a background color, flickering and so on may be performed. Further, when the display of the navigate window 50 is directed in the state in which an object on the user control screen 70 is selected, the component corresponding to the origin of the object selected by the position of the cursor 51 and so on may be similarly displayed.

Besides, in the user control screen, the original component of each of the objects disposed in the screen may be displayed. This makes it possible to easily realize which component the control screen opened in accordance with the direction such as "Open Original" and the like relates to.

It is conceivable that after a control (called a control X) is disposed on the user control screen 70, the original component of the control is deleted by edit of the CAD data, and in this case, the following operation can be performed.

First, the parameter corresponding to the original of the control X is eliminated, and therefore, it is suitable to invalidate the control X in the execution mode so as to make it impossible to perform an operation of changing the parameter. However, in the edit mode, move and duplicate, edit such as property change and so on may be made possible.

In this case, the control screen for the original component of the control X does not exist any more, and therefore, it cannot be displayed. Accordingly, as for the control X, it is preferable not to accept display direction of the control screen by making selection of "Open Original" impossible in the menu as shown in FIG. 11, or by not displaying the choice.

5. Function of Store and Recall of Parameters Related to User Control Screen: FIG. 15 to FIG. 18

Another characteristic point in the mixer system as described above is the point that for each of the user control screens, parameters related to the user control screen can be stored and recalled in a component unit. Next, an operation associated with this point will be described.

First, by using FIG. 15 and FIG. 16, a method for directing store and recall of the related parameters will be described.

Figure 15:
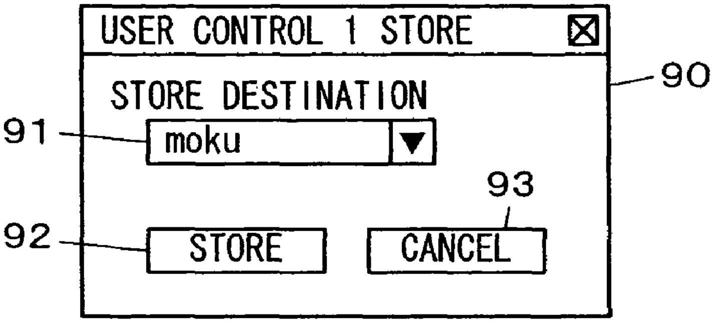
FIG. 15 is a diagram showing a display example of a store screen displayed on the display of the PC shown in FIG. 1.

In this mixer system, when a user presses the store key 72 for directing store of a parameter related to the user control screen 70 by left click of the mouse or the like on the user control screen 70 displayed on the display, a store screen 90 as shown in FIG. 15 is displayed in the vicinity of the store key 72.

This store screen 90 is a screen for selecting the UC preset being a storage destination of a parameter. When a UC preset is selected by a pull-down menu of a storage destination designating portion 91, and a store key 92 is pressed, a parameter related to the user control screen 70 is stored in the selected UC preset. Then, the store screen 90 is erased to return to the previous user control screen 70. Note that it is possible to input an optional name into the storage destination designating portion 91. When a cancel key 93 is pressed, the store screen 90 is erased without performing store of a parameter to directly return to the previous user control screen 70.

Figure 16:
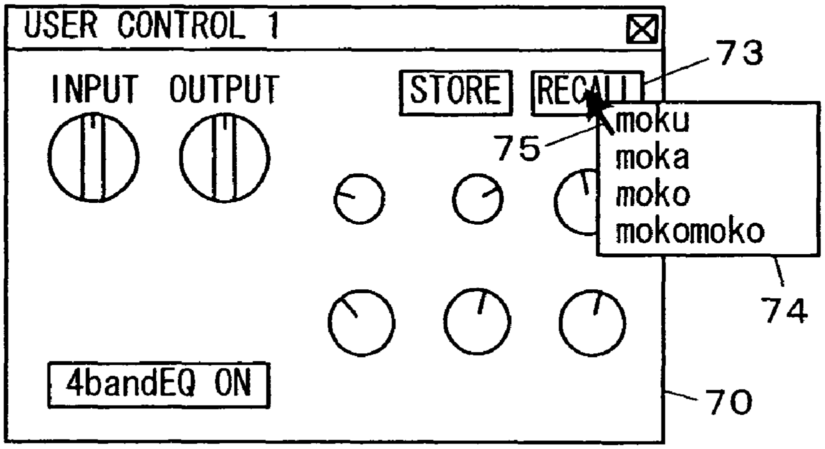
FIG. 16 is a diagram showing a display example when a recall key is pressed on a user control screen shown in FIG. 6.

When the user operates the recall key 73 for directing recall of a parameter related to the user control screen 70 on the user control screen 70, a menu 74 as shown in FIG. 16 is displayed in the vicinity of the recall key 73 and selection of the UC preset to be recalled is accepted. The menu 74 displays a list of UC presets in the UC data about the user control screen 70, and the user positions a pointer 75 in the UC preset of which recall is desired in the list and clicks the left mouse button, whereby the user can direct the recall of that UC preset. In this case, the PC 30 reads the content of the designated UC preset and writes the part of the UC preset related to the user control screen 70 at the point of the time of recall into the current memory, and thereby performs the processing of recall.

When the direction of store or recall of a UC preset is accepted by causing the display to display the store screen 90 or the menu 74 as described above, the CPU of the PC 30 functions as an acceptor.

Figure 17:
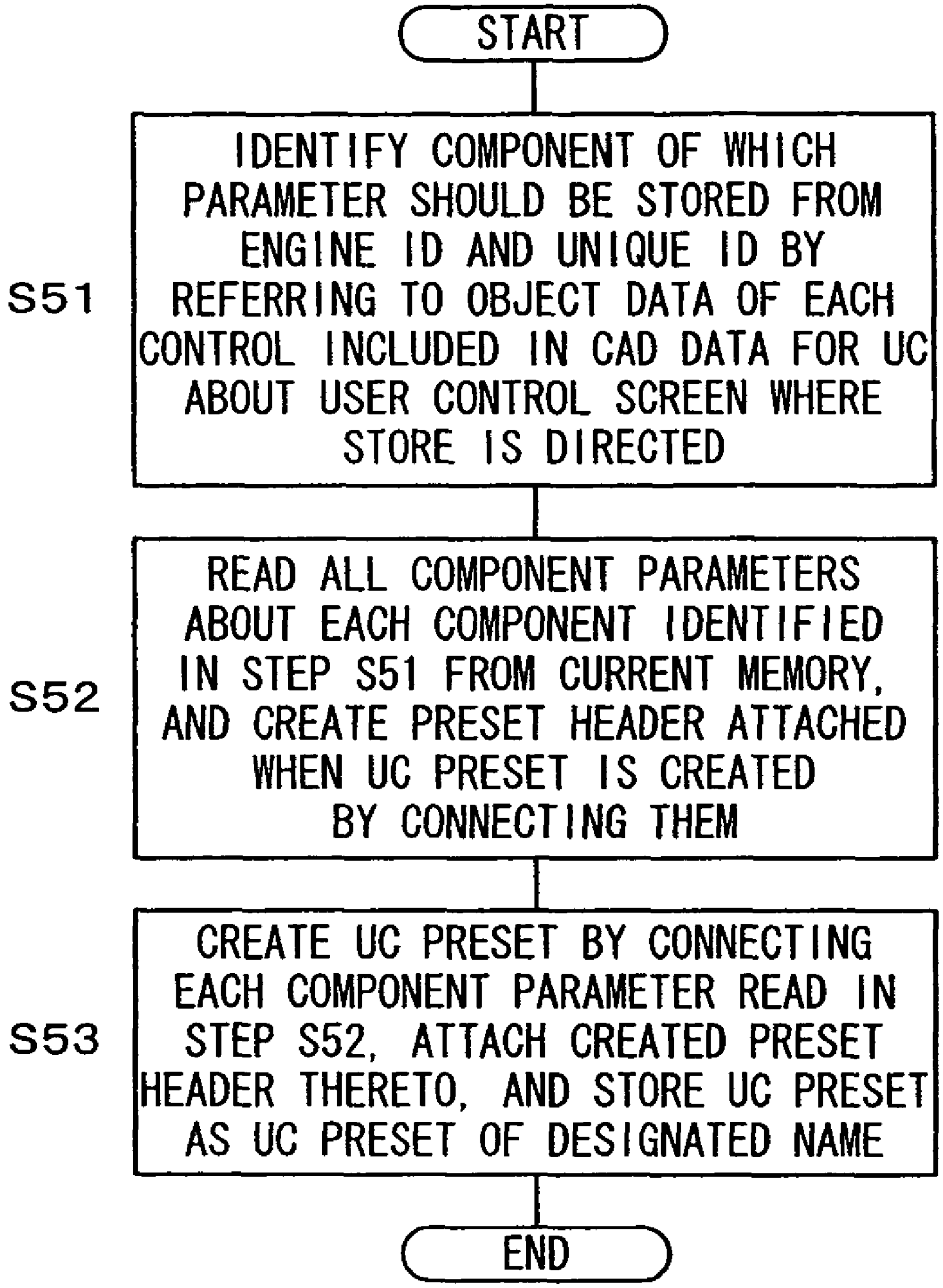
FIG. 17 is a flowchart of processing executed by the CPU of the PC shown in FIG. 1 when store of a UC preset is directed.

Next, FIG. 17 shows a flowchart of the processing which the CPU of the PC 30 executes when store of a UC preset is directed. In FIG. 17, a control concerning display and erasure of the store screen 90 is not shown.

When a UC preset is designated and store is directed by the store screen or the like shown in FIG. 15, the CPU of the PC 30 starts processing shown in the flowchart in FIG. 17.

Then, the CPU first refers to the object data of each of the controls included in the CAD data for UC about the user control screen in which the store is directed, and identifies components of which parameter should be stored from the engine IDs and unique IDs of them (S51). Here, all components which the engine ID and unique ID in the object data about at least one control indicate, namely, a component which is the origin of at least one control in the user control screen in which the store is directed, is the component of which parameter should be stored.

Whether each of the objects is a control or not can be determined by identifying the component in the CAD data for PC by the engine ID and the unique ID in the object data, and obtaining information of the object corresponding to the parameter ID by referring to the preset component data corresponding to the component ID of the component. However, information of the characteristics of whether the object is a control, a display portion, a label or the other object may be described in the object data, so that it can be determined by referring to this.

Next, the CPU reads component parameters about each component designated in Step S51 from the current memory, and creates a preset header assigned when the UC preset is created by connecting them (S52). The content is as described by using FIG. 9, and as for the UC preset name, the name designated in the store destination designating portion 81 on the store screen 90 or the name of default is used.

Thereafter, the CPU connects the respective component parameters read out, and assigns the created preset header to create the UC preset, and stores the UC preset as the designated UC preset in the UC data corresponding to the user control screen in which the store is directed (S53), and the processing ends.

By the above processing, the parameter related to the user control screen 70 can be stored as the UC preset about the user control screen 70 in accordance with the direction of the user. In the above processing, the CPU of the PC 30 functions as a storing device.

Figure 18:
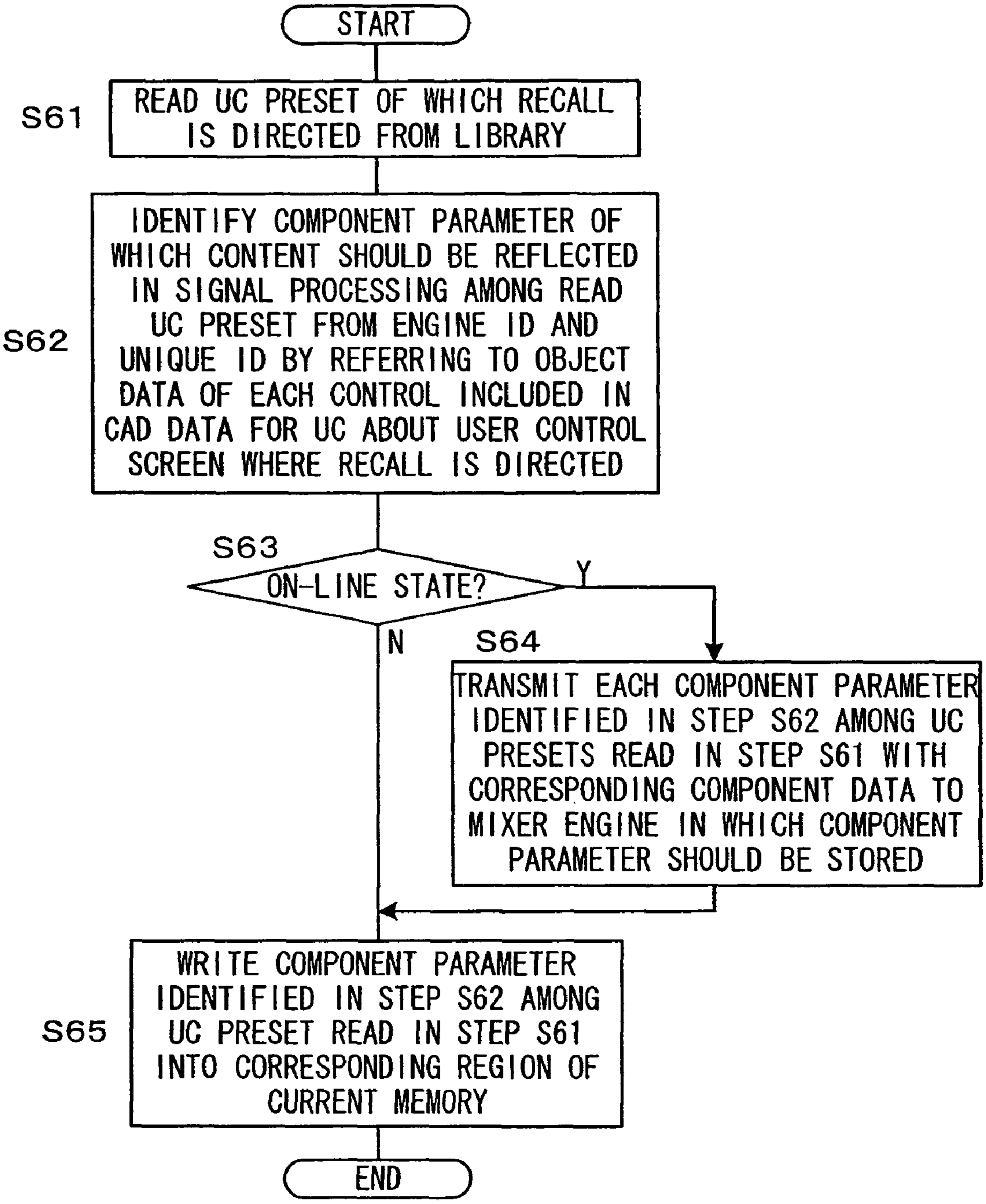
FIG. 18 is a flowchart of processing executed by the same when recall of a UC preset is directed.

Next, FIG. 18 shows a flowchart of the processing which the CPU of the PC 30 executes when the recall of a UC preset is directed. In FIG. 18, control related to the display and erasure of the menu 74 is not shown.

The CPU of the PC 30 starts the processing shown in the flowchart in FIG. 18 when a UC preset is designated by the menu 74 shown in FIG. 16 or the like and recall is directed.

Then, the CPU first reads the UC preset of which recall is directed (S61). It is preferable that this UC preset is basically from the UC data about the user control screen in which the recall direction is performed. However, in the range in which the unique ID used in this user control screen is valid, any preset can be normally recalled, and therefore, a UC preset of another user control screen of the configuration data to which this user control screen belongs may be recalled. Besides, in the case of different configuration data, unique IDs are assigned independently, and the basis of the unique IDs of the different configuration data is not common. Therefore, a UC preset in the configuration data differing from the configuration data to which the user control screen where the recall direction is made belongs cannot be basically recalled. Therefore, it is suitable to make it impossible to direct recall of the UC preset of different configuration data.

After Step S61, the CPU refers to the object data of each of the controls included in the CAD data for UC about the user control screen in which the recall direction is made, and identifies a component parameter to be reflected in signal processing among the read UC preset from the engine ID and the unique ID (S62). An identification method of a component and a discrimination method of a control at this time are the same as in the case of Step S51 in FIG. 17. Accordingly, the identified component parameter is a component parameter about each component which is the origin of at least one control in the user control screen in which the recall direction is made.

If the PC 30 is in the on-line state, the CPU transmits each component parameter identified in Step S62 as well as the corresponding component data to the mixer engine 10 which should store the component parameter (S63, S64). To which mixer engine each component parameter should be transmitted can be recognized by the engine ID in the corresponding component data.

Thereafter, the CPU writes each component parameter identified in Step S62 into a corresponding region in the current memory, namely, a region in which the component parameters about the same component are stored (S65), and the processing ends.

In this processing, the CPU of the PC 30 functions as a recalling device.

Though the processing on the mixer engine 10 side is omitted in the drawing, the processing of writing the component parameter, which is transmitted in Step S64, into a corresponding region in the current memory on the mixer engine 10 side is performed. There is no UC data on the mixer engine 10 side, but the received component parameter is about the component identified by the unique ID, and therefore, it is not necessary to refer to the UC data for performing this writing processing.

Further, data of the component ID relating to each component parameter may be transmitted from the PC 30. Thereby, on the mixer engine 10 side, the received component parameter can be written into the current memory after it is confirmed that the received component parameter is in a suitable format as a parameter used for the preset component related to the received component ID.

By the above-described processing, a UC preset is read out in accordance with the direction of a user, and in this, a parameter related to the user control screen 70 can be selectively written into the current memories of both the PC 30 and the mixer engine 10.

As explained thus far, in this mixer system, a store range is specified with a component as a unit when store of a parameter related with the user control screen is performed, and if even one control is duplicated and disposed onto the user control screen from the control screen of a certain component, all the parameters used for signal processing related to that component are stored as the UC preset. Accordingly, even when the stored UC preset is recalled, a value which loses balance with the other parameters is not set at only some of the parameters in the component, and the state in which the value of each parameter is balanced can be kept in accordance with the intention of a user at least in a component unit. The demand to collectively store and recall the parameters operable in the user control screen can be satisfied.

Accordingly, convenience in store and recall of parameters in use of a user control screen editable by a user can be enhanced.

When a UC preset is recalled, as for a component which is not an origin of any control disposed on the user control screen at the point of time of recall, the parameters of the component are not written into the current memory, and therefore, an unnecessary parameter which is not related to the user control screen is not recalled at the point of time of recall, thus making it possible to perform an operation corresponding to the purport of the function of recalling a parameter related to the user control screen. Thereby, it is possible to perform an operation of recalling the UC preset stored as the parameter related to another user control screen, and writing into the current memory only the parameters in the UC preset, which is related to the user control screen in which the recall direction is made.

Further, even a component which is the origin of a control disposed on the user control screen at the point of time of recall is not written into the current memory when the component parameter of that component is not included in the recalled UC preset, and therefore, when a control is added to the user control screen after store of the UC preset, the situation in which an initial value is overwritten in the current memory against the intention of the user can be prevented. However, this is not essential.

The case where after a control (called a control X) is disposed on the user control screen 70, the original component of the control is deleted by edit of the CAD data is conceivable, but in such a case, it is preferable to perform the following operation.

First, when recall of a UC preset is directed in the user control screen 70, even if the recalled UC preset includes the component parameter of the original component of the control X, the current memory does not have a region for storing the parameter any more, and therefore, it is suitable not to write the parameter into the current memory.

Further, when store of the UC preset is directed, the current scene does not include the component parameter of the original component of the control X, and therefore, the UC preset at the storage destination does not include the component parameter of the original component of the control X.

The explanation of the embodiment will now be finished, but the present invention is not limited to the above-described embodiment.

First, it is a matter of course that the controls for accepting directions to store and recall a UC preset is not limited to those shown in FIG. 15 and FIG. 16. It is conceivable to handle, for example, a UC preset as one file in a file system, and accept directions of store and recall by an interface which is also used for save and load of files. In this case, it is conceivable to provide a folder for each user control screen, and store a UC preset corresponding to each user control screen in the folder corresponding to the user control screen. In this way, by simply directing recall of the UC preset of a different folder from the folder of the user control screen relating to the recall direction, it is made possible to direct to recall the UC preset corresponding to the different user control screen.

"Relation" of a parameter stored and recalled as a UC preset and a user control screen is not limited to the above described relationship. For example, the component parameters of the original components of not only controls but also a display portion, labels and so on which are disposed on the user control screen may be the targets of store and recall. Alternately, in consideration of relationship with the parameters, the objects related with any parameters such as the display portion performing display of parameters and the like may be made the targets, and the objects which are not related to any parameters such as labels and the like may not be made the targets.

Besides, a group of parameters to be collectively stored/recalled is defined in a smaller unit or a larger unit than the component, and in the above-described processing in FIG. 17 and FIG. 18, a parameter to be stored/recalled in the group unit may be identified.

Besides, in the user control screen, the original component of each of the objects disposed in the screen may be displayed. This makes it easily recognizable that a parameter relating to which component is the target of store/recall in that user control screen.

The composition of data is not limited to those shown in FIG. 7A to FIG. 9, and the display example of the screen is not limited to those shown in FIG. 3 to FIG. 6, FIG. 11, FIG. 15, and FIG. 16. Further, it is not necessary that the display is included in the PC 30, and an external display may be used. Further, as a control device for the mixer system, a dedicated control device may be used instead of the PC 30, or the control device may be integrated with the audio signal processing apparatus. The number of audio signal processing apparatuses which the control device controls is optional, and different audio signal processing apparatuses may be connected to the control device as necessary.

Further, the above-described program of the invention can provide the same effect when it is provided by being recorded in a nonvolatile recording medium (memory) such as a CD-ROM, a flexible disk or the like, and this program is read to the RAM of the PC 30 from the memory to cause the CPU to execute the program, and when the program is downloaded from an external device including the recording medium recording the program or an external device storing the program in a memory such as an HDD or the like, and executed, as well as when the program is stored in the HDD or the like of the PC 30 in advance.

As explained thus far, according to the control device or the program of the present invention, in the control device which causes the audio signal processing device having the audio signal processor wherein a processing content can be programmed to execute signal processing based on the configuration of signal processing having a plurality of components and wires connecting the components, operability in use of a control screen editable by a user can be enhanced. Accordingly, by utilizing the present invention, the control device with high operability can be provided.

Besides, convenience concerning store and recall of parameters when using the editable control screen can be also enhanced. Accordingly, by utilizing the present invention, the control device with high convenience can be provided.

What is claimed is:

1. A control device for controlling an audio signal processing device having a signal processor wherein the audio signal processing device executes a signal processing of a configuration constructed of a plurality of components for processing audio signals and wires connecting the components for transferring the audio signals between the components, the control device comprising:

a display;

a current memory that stores parameters of each component in the configuration for controlling the signal processing of the component;

a first controller that prepares, for each component in the configuration, a first control screen, on which a plurality of first controls for setting the parameters of the component in the current memory are disposed, and displays the first control screen on the display;

a second controller that duplicates one or more of the first controls on the first control screen, disposes one or more second controls, which are duplicates of the first controls, on a second control screen, and displays the second control screen on the display;

a parameter editor that, in response to an operation on any of the first controls on the first screen and the second controls on the second screen, modifies a parameter corresponding to the operated control in the current memory;

an accepting device that accepts an open original direction with respect to one second control among the second controls on the second control screen, the open original direction being generated in response to a predetermined user operation on the one second control on the second control screen; and wherein the first controller displays the first control screen including the first control corresponding to the one second control on the second screen in response to the open original direction with respect to the one second control.

2. A control device according to claim 1, wherein, when one second control among the second controls on the second control screen is designated and operated in a predetermined manner, said accepting device displays a control portion for accepting the open original direction with respect to the one second control, in a vicinity of the one second control on the display.

3. A control device according to claim 1, further comprising:

a third controller that displays a navigation screen having thereon names of components in the configuration, and issues, in response to one of the names being selected, a direction to display the first control screen of a component corresponding to the selected name on the display, wherein, in response to one of the names on the navigation screen being selected and the third controller issuing the direction, the first controller displays the first screen of a component corresponding to the selected name, and wherein, in response to the open original direction with respect to the one second control, the third controller points to, on the navigation screen, the name of the component, of which the first control screen has the first control corresponding to the one second control.

4. A control device for controlling an audio signal processing device having a signal processor wherein the audio signal processing device executes a signal processing of a configuration constructed of a plurality of components for processing audio signals and wires connecting the components for transferring the audio signals between the components, comprising:

a display;

a current memory that stores parameters of each component in the configuration for controlling the signal processing of the component;

a first controller that prepares, for each component in the configuration, a first control screen, on which a plurality of first controls for setting the parameters of the component in the current memory are disposed, and displays the first control screen on the display;

a second controller that duplicates one or more of the first controls on the first control screen, dispose one or more second controls, which are duplicates of the first controls, on a second control screen, and displays the second control screen on the display;

a parameter editor that, in response to an operation on any of the first controls on the first screen and the second controls on the second screen, modifies a parameter corresponding to the operated control in the current memory;

a library that stores a plurality of sets of parameters for the second control screen;

an accepting device that accepts a store direction to store parameters relating to the second control screen and a recall direction to recall the parameters relating to the second control screen;

a storing device that, in response to the store direction, specifies one or more components in the configuration, each of the specified components corresponding to a first control screen having at least one first control thereon corresponding to one of second controls on the second control screen, reads the parameters of the specified components, among the parameters of the components in the configuration, stored in the current memory, and writes the read parameters into the library as a set of parameters relating to the second screen; and a recalling device that, in response to the recall direction, reads a set of parameters from the library, specifies one or more components in the configuration, each of the specified components corresponding to a first control screen having at least one first control thereon corresponding to one of second controls on the second control screen, and writes the read set of parameters into the current memory as the parameters of the specified component.

5. A control device according to claim 4, wherein if the read set of parameters include parameters of one component and the first control screen of the component does not have at least one first control corresponding to at least one of second controls on the second control screen, the recalling device does not write parameters of the one component into said current memory.

6. A computer readable storage medium storing program instructions executable by a computer and causing said computer to function as a control device for controlling an audio signal processing device having a signal processor wherein the audio signal processing device executes a signal processing of a configuration constructed of a plurality of components for processing audio signals and wires connecting the components for transferring the audio signals between the components, the control device comprising:

a display;

a current memory that stores parameters of each component in the configuration for controlling the signal processing of the component;

a first controller that prepares, for each component in the configuration, a first control screen, on which a plurality of first controls for setting the parameters of the component in the current memory are disposed, and displays the first control screen on the display;

a second controller that duplicates one or more of the first controls on the first control screen, disposes one or more second controls, which are duplicates of the first controls, on a second control screen, and displays the second control screen on the display;

a parameter editor that, in response to an operation on any of the first controls on the first screen and the second controls on the second screen, modifies a parameter corresponding to the operated control in the current memory;

an accepting device that accepts an open original direction with respect to one second control among the second controls on the second control screen, the open original direction being generated in response to a predetermined user operation on the one second control on the second control screen; and wherein the first controller displays the first control screen including the first control corresponding to the one second control on the second screen in response to the open original direction with respect to the one second control.

7. The computer readable storage medium of claim 6, wherein, when one second control among the second controls on the second control screen is designated and operated in a predetermined manner, said accepting device displays a control portion for accepting the open original direction with respect to the one second control, in a vicinity of the one second control on the display.

8. The computer readable storage medium of claim 6, wherein the control device further comprising:

a third controller that displays a navigation screen having thereon names of components in the configuration, and issues, in response to one of the names being selected, a direction to display the first control screen of a component corresponding to the selected name on the display, wherein, in response to one of the names on the navigation screen being selected and the third controller issuing the direction, the first controller displays the first screen of a component corresponding to the selected name, and wherein, in response to the open original direction with respect to the one second control, the third controller points to, on the navigation screen, the name of the component, of which the first control screen has the first control corresponding to the one second control.

9. A computer readable storage medium storing program instructions executable by a computer and causing said computer to function as a control device for controlling an audio signal processing device having a signal processor wherein the audio signal processing device executes a signal processing of a configuration constructed of a plurality of components for processing audio signals and wires connecting the components for transferring the audio signals between the components, comprising:

a display;

a current memory that stores parameters of each component in the configuration for controlling the signal processing of the component;

a first controller that prepares, for each component in the configuration, a first control screen, on which a plurality of first controls for setting the parameters of the component in the current memory are disposed, and displays the first control screen on the display;

a second controller that duplicates one or more of the first controls on the first control screen, dispose one or more second controls, which are duplicates of the first controls, on a second control screen, and displays the second control screen on the display;

a parameter editor that, in response to an operation on any of the first controls on the first screen and the second controls on the second screen, modifies a parameter corresponding to the operated control in the current memory;

a library that stores a plurality of sets of parameters for the second control screen;

an accepting device that accepts a store direction to store parameters relating to the second control screen and a recall direction to recall the parameters relating to the second control screen;

a storing device that, in response to the store direction, specifies one or more components in the configuration, each of the specified components corresponding to a first control screen having at least one first control thereon corresponding to one of second controls on the second control screen, reads the parameters of the specified components, among the parameters of the components in the configuration, stored in the current memory, and writes the read parameters into the library as a set of parameters relating to the second screen; and a recalling device that, in response to the recall direction, reads a set of parameters from the library, specifies one or more components in the configuration, each of the specified components corresponding to a first control screen having at least one first control thereon corresponding to one of second controls on the second control screen, and writes the read set of parameters into the current memory as the parameters of the specified component.

10. The computer readable storage medium of claim 9, wherein if the read set of parameters include parameters of one component and the first control screen of the component does not have at least one first control corresponding to at least one of second controls on the second control screen, the recalling device does not write parameters of the one component into said current memory.

* * * * *